(12) United States Patent
Lee et al.

(10) Patent No.: US 12,189,238 B2
(45) Date of Patent: Jan. 7, 2025

(54) BACKLIGHT UNIT AND DISPLAY DEVICE COMPRISING SAME

(71) Applicant: Samsung Display Co., LTD., Yongin-si (KR)

(72) Inventors: Dae Sik Lee, Hwaseong-si (KR); Sung Chul Hong, Asan-si (KR); Jun Pyo Lee, Asan-si (KR); Ji Eun Lee, Seoul (KR); Song Yi Han, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 353 days.

(21) Appl. No.: 17/626,259

(22) PCT Filed: Apr. 7, 2020

(86) PCT No.: PCT/KR2020/004668
§ 371 (c)(1),
(2) Date: Jan. 11, 2022

(87) PCT Pub. No.: WO2021/010572
PCT Pub. Date: Jan. 21, 2021

(65) Prior Publication Data
US 2022/0276533 A1    Sep. 1, 2022

(30) Foreign Application Priority Data

Jul. 12, 2019 (KR) .......................... 10-2019-0084190

(51) Int. Cl.
*G02F 1/1335* (2006.01)
*G02F 1/13357* (2006.01)

(52) U.S. Cl.
CPC .. *G02F 1/133612* (2021.01); *G02F 1/133603* (2013.01)

(58) Field of Classification Search
CPC ...... G09G 2320/0233; G02F 1/133603; G02F 1/133612
See application file for complete search history.

(56) References Cited

U.S. PATENT DOCUMENTS 11,004,382 B2    5/2021    Li et al.
2007/0296650 A1*    12/2007    Chang ................. G09G 3/3216
345/76

(Continued)

FOREIGN PATENT DOCUMENTS

CN    104793820    7/2015
CN    109116626    1/2019

(Continued)

OTHER PUBLICATIONS

Translation of KR 101888428 (Year: 2018).*
International Search Report, with English translation, corresponding to International Application No. PCT/KR2020/004668 dated Jul. 22, 2020.

(Continued)

*Primary Examiner* — Sean P Gramling
(74) *Attorney, Agent, or Firm* — KILE PARK REED & HOUTTEMAN PLLC

(57) ABSTRACT

A backlight unit includes a substrate comprising a first area having light source blocks and a second area having light source blocks, and a light source driver disposed on at least one side of the substrate and electrically connected to the light source blocks of each of the first and second areas through each of first and second sensing lines. The first sensing lines electrically connected to the light source blocks of the first area have a first resistance value, and the second sensing lines electrically connected to the light source blocks of the second area have a second resistance value.

21 Claims, 19 Drawing Sheets

(56) References Cited

U.S. PATENT DOCUMENTS

| | | | |
|---|---|---|---|
| 2009/0021496 A1* | 1/2009 | Silzars | G09F 13/22 |
| | | | 345/204 |
| 2010/0177086 A1* | 7/2010 | Nakamura | G09G 3/3258 |
| | | | 345/76 |
| 2010/0295876 A1 | 11/2010 | Shin et al. | |
| 2013/0099666 A1* | 4/2013 | Stuffle | G09F 13/22 |
| | | | 315/52 |
| 2013/0169190 A1 | 7/2013 | Fujita | |
| 2015/0131016 A1 | 5/2015 | Kim et al. | |
| 2015/0287348 A1* | 10/2015 | Lee | F21V 23/002 |
| | | | 362/249.01 |
| 2018/0061341 A1* | 3/2018 | Kang | G09G 3/3685 |
| 2020/0110307 A1* | 4/2020 | Chang | G09G 3/32 |
| 2022/0276533 A1* | 9/2022 | Lee | G02F 1/133612 |

FOREIGN PATENT DOCUMENTS

| | | |
|---|---|---|
| JP | 2006-352116 | 12/2006 |
| KR | 10-2005-0061800 | 6/2005 |
| KR | 10-0600332 | 7/2006 |
| KR | 10-2012-0047390 | 5/2012 |
| KR | 10-2013-0047463 | 5/2013 |
| KR | 10-2018-0026020 | 3/2018 |
| KR | 10-1888428 | 8/2018 |

OTHER PUBLICATIONS

Written Opinion, with English translation, corresponding to International Application No. PCT/KR2020/004668, dated Jul. 22, 2020.
Extended European Search Report for European Patent Application No. 20840537.3, dated May 12, 2023.

\* cited by examiner

BACKLIGHT UNIT AND DISPLAY DEVICE COMPRISING SAME

CROSS-REFERENCE TO RELATED APPLICATION(S)

This application is a national entry of International Application No. PCT/KR2020/004668, filed on Apr. 7, 2020, which claims under 35 U.S.C. §§ 119(a) and 365(b) priority to and benefits of Korean Patent Application No. 10-2019-0084190, filed on Jul. 12, 2019, in the Korean Intellectual Property Office (KIPO), the entire contents of which are incorporated herein by reference.

BACKGROUND

1. Technical Field

The disclosure relates to a backlight unit and a display device comprising same.

2. Description of Related Art

The importance of display devices as communication media, has been emphasized because of the developments of information technology. For example, the display devices have been applied to various electronic devices such as smartphones, digital cameras, notebook computers, navigation devices, and smart televisions. The display devices may be flat panel display devices such as liquid crystal display devices, field emission display devices, and organic light emitting display devices.

The liquid crystal display device includes an array substrate including thin-film transistors, an upper substrate including color filters and/or a black matrix, and a liquid crystal layer disposed between the array substrate and the upper substrate. The liquid crystal display device displays an image by adjusting the arrangement of the liquid crystal layer according to an electric field applied between two electrodes in a pixel and adjusting the light transmittance according to the arrangement of the light crystal layer.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a backlight unit capable of minimizing power loss and heat generation of a sensing line or a light source driver and a display device including the backlight unit.

However, aspects of the disclosure are not restricted to the one set forth herein. The above and other aspects of the disclosure will become more apparent to one of ordinary skill in the art to which the disclosure pertains by referencing the detailed description of the disclosure given below.

According to an embodiment of the disclosure, a backlight unit comprises a substrate comprising a first area having light source blocks and a second area having light source blocks, and a light source driver disposed on at least one side of the substrate and electrically connected to the light source blocks of each of the first and second areas through each of first and second sensing lines. The first sensing lines electrically connected to the light source blocks of the first area have a first resistance value, and the second sensing lines electrically connected to the light source blocks of the second area have a second resistance value.

Each of the first and second sensing lines may have different cross-sectional areas according to a length of each of the first and second sensing lines.

Cross-sectional areas of each of the first sensing lines may be proportional to distances between each of the light source blocks of the first area and the light source driver, and cross-sectional areas of each of the second sensing lines may be proportional to distances between each of the light source blocks of the second area and the light source driver.

The first area may be closer to the light source driver than the second area, and the first resistance value may be smaller than the second resistance value.

The backlight unit may further comprise a power supply part supplying a first driving voltage to the light source blocks of the first area and supplying a second driving voltage to the light source blocks of the second area.

The first area may be closer to the light source driver than the second area, and the first driving voltage may be smaller than the second driving voltage.

A difference between the first and second driving voltages may correspond to a difference between a voltage applied to the first sensing lines and a voltage applied to the second sensing lines.

The power supply part may generate the first and second driving voltages based on first and second feedback voltages received from the light source driver, respectively.

The power supply part may supply each of the first and second driving voltages through each of first and second power supply lines, and the first and second power supply lines may have a same resistance value.

The substrate may further comprise a third area having light source blocks, and the light source driver may be electrically connected to the light source blocks of the third area through third sensing lines having a third resistance value.

The third sensing lines may have different cross-sectional areas according to each of lengths of the third sensing lines.

The backlight unit may further comprise a power supply part providing first to third driving voltages to the light source blocks of the first to third areas based on first to third feedback voltages received from the light source driver.

The light source driver may comprise a first light source driver disposed adjacent to the first area and electrically connected to the light source blocks of the first area, and a second light source driver disposed adjacent to the second area and electrically connected to the light source blocks of the second area.

The backlight unit may further comprise a power supply part supplying a same driving voltage to the light source blocks of the first and second areas. The first resistance value and the second resistance value may be equal to each other.

Each of the first and second sensing lines may have different cross-sectional areas according to the length of each of the first and second sensing lines.

The first and second sensing lines may have a same cross-sectional area and a same length.

Each of the light source blocks of the first and second sensing lines may comprise at least one mini-light emitting diode (LED) or micro-LED.

According to an embodiment of the disclosure, a backlight unit comprises a substrate comprising light source blocks, a power supply part supplying a driving voltage to the light source blocks, and a light source driver disposed on a side of the substrate and electrically connected to the substrate through sensing lines electrically connected to the light source blocks. The power supply part supplies a same driving voltage to the light source blocks, and the sensing lines electrically connected to each of the light source blocks have a same resistance value.

The sensing lines may have different cross-sectional areas according to lengths of each of the sensing lines.

The sensing lines may have a same cross-sectional area and a same length.

According to an embodiment of the disclosure, a display device comprises a display panel displaying an image, and a backlight unit irradiating light to the display panel. The backlight unit comprises a substrate comprising a first area having light source blocks and a second area having light source blocks, and a light source driver disposed on at least one side of the substrate and electrically connected to the light source blocks of each of the first and second areas through each of first and second sensing lines. The first sensing lines electrically connected to the light source blocks of the first area have a first resistance value, and the second sensing lines electrically connected to the light source blocks of the second area have a second resistance value.

Other details of the disclosure are included in the detailed description and the drawings.

In a backlight unit and a display device comprising the same according to embodiments, sensing lines electrically connected to light source blocks disposed in each of areas of a substrate may have different cross-sectional areas according to lengths of the sensing lines, respectively. Therefore, sensing lines electrically connected to light source blocks in one of the areas may have a same resistance value, and the magnitude of a driving voltage applied to the light source blocks may be reduced. Accordingly, power loss and heat generation of the sensing lines and a light source driver may be minimized and the efficiency of the backlight unit may be improved.

In a backlight unit and a display device comprising same according to embodiments, sensing lines electrically connected to light source blocks disposed in each of areas of a substrate may have a same cross-sectional area and a same length. Therefore, sensing lines electrically connected to light source blocks in an area may have the same resistance value. Accordingly, power loss and heat generation of the sensing lines and a light source driver may be minimized and the efficiency of the backlight unit may be improved.

However, the effects of the disclosure are not limited to the aforementioned effects, and various other effects are included in the specification.

BRIEF DESCRIPTION OF THE DRAWINGS

An additional appreciation according to the embodiments of the disclosure will become more apparent by describing in detail the embodiments thereof with reference to the accompanying drawings, wherein.

DETAILED DESCRIPTION OF THE EMBODIMENTS

Figure 1:
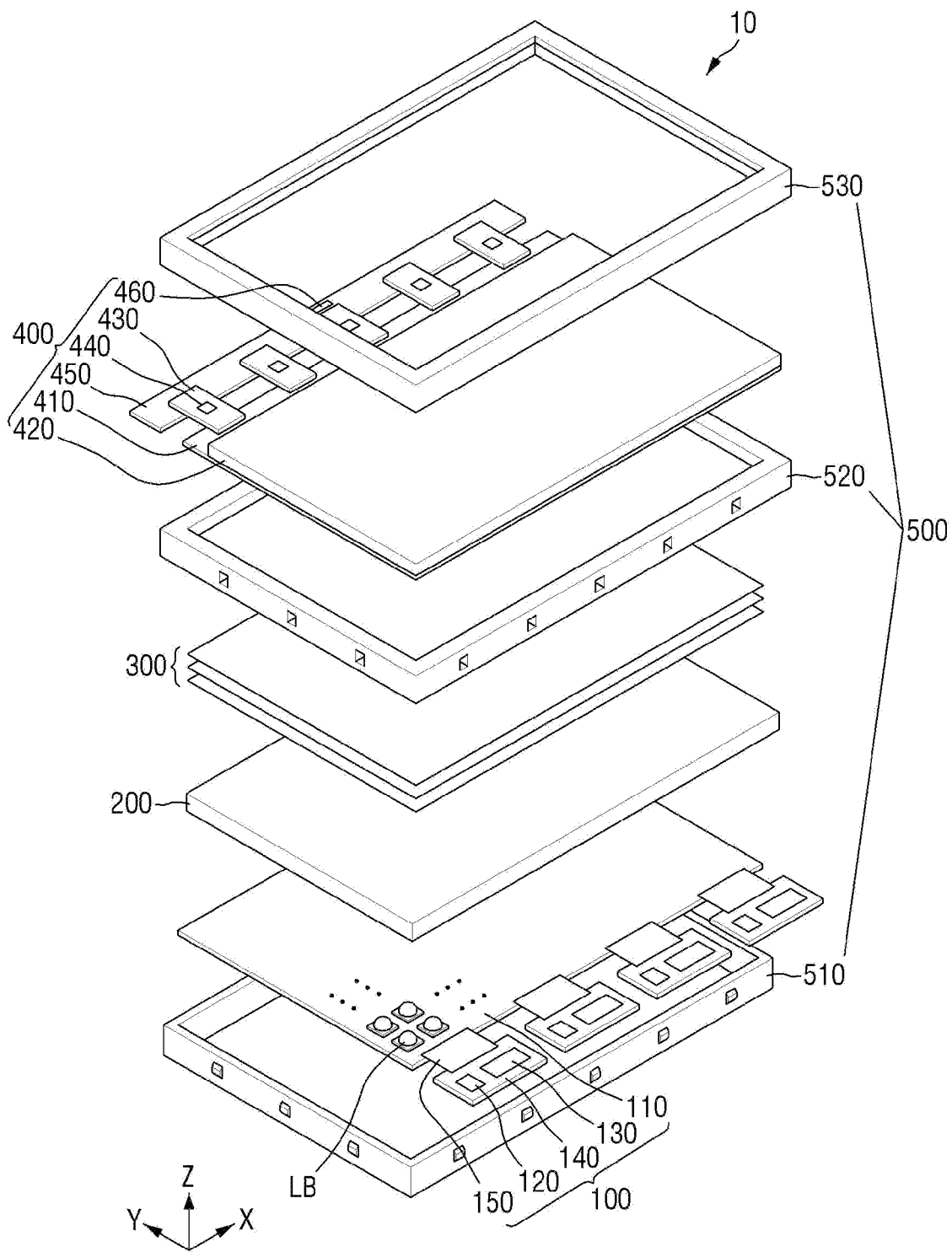
FIG. 1 is an exploded perspective view schematically illustrating a display device according to an embodiment.

Embodiments of the disclosure will be described hereinafter with reference to the accompanying drawings. Although the embodiments may be modified in various manners and have additional embodiments, embodiments are illustrated in the accompanying drawings and will be mainly described in the specification. However, the scope of the disclosure is not limited to the embodiments in the accompanying drawings and the specification should be construed as including all the changes, equivalents and substitutions included in the spirit and scope of the disclosure.

In the drawings, sizes and thicknesses of elements may be enlarged for clarity and ease of description thereof. However, the disclosure is not limited to the illustrated sizes and thicknesses. In the drawings, the thicknesses of layers, films, panels, regions, and other elements may be exaggerated for clarity. In the drawings, for better understanding and ease of description, the thicknesses of some layers and areas may be exaggerated.

Further, in the specification, the phrase "in a plan view" means when an object portion is viewed from above, and the phrase "in a cross-sectional view" means when a cross-section taken by vertically cutting an object portion is viewed from the side.

When a layer, film, region, substrate, or area, is referred to as being "on" another layer, film, region, substrate, or area, it may be directly on the other layer, film, region, substrate, or area, or intervening layers, films, regions, substrates, or areas, may be present therebetween. Conversely, when a layer, film, region, substrate, or area, is referred to as being "directly on" another layer, film, region, substrate, or area, intervening layers, films, regions, substrates, or areas, may be absent therebetween. Further when a layer, film, region, substrate, or area, is referred to as being "below" another layer, film, region, substrate, or area, it may be directly below the other layer, film, region, substrate, or area, or intervening layers, films, regions, substrates, or areas, may be present therebetween. Conversely, when a layer, film, region, substrate, or area, is referred to as being "directly below" another layer, film, region, substrate, or area, intervening layers, films, regions, substrates, or areas, may be absent therebetween. Further, "over" or "on" may include positioning on or below an object and does not necessarily imply a direction based upon gravity.

Some of the parts which are not associated with the description may not be provided in order to describe embodiments of the disclosure and like reference numbers refer to like elements throughout the specification.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Throughout the specification, when an element is referred to as being "connected" to another element, the element may be "directly connected" to another element, or "electrically connected" to another element with one or more intervening elements interposed therebetween. It will be further understood that when the terms "comprises," "comprising," "includes" and/or "including" are used in this specification, they or it may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein. For example, a first color filter may be any one of a red, green, or blue color filter. A second color filter may be any one of a red, green, or blue color filter. A third color filter may be any one of a red, green, or blue color filter. First and second with respect to the light blocking members may be used interchangeably in the specification.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 80%, 5% of the stated value.

In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

FIG. 1 is an exploded perspective view schematically illustrating a display device according to an embodiment.

In the specification, "above," "top," and "upper surface" refer to an upward direction of a display device 10, which is a Z-axis direction. The terms "under," "bottom," and "lower surface" refer to a downward direction of the display device 10, which is a direction opposite to the Z-axis direction. In addition, "left," "right," "upper," and "lower" respectively refer to left, right, upper, and lower directions of the display device 10 in a plan view. For example, "left" refers to a direction opposite to an X-axis direction, "right" refers to the X-axis direction, "upper" refers to a Y-axis direction, and "lower" refers to a direction opposite to the Y-axis direction.

Referring to FIG. 1, the display device 10 according to the embodiment may include a backlight unit 100, a diffuser plate 200, an optical sheet part 300, a display panel 400, and a case member 500.

The backlight unit 100 may include a substrate 110, power supply parts 120, light source drivers 130, printed circuit boards 140, and flexible films 150.

The substrate 110 may include light source blocks LB. Each of the light source blocks LB may include at least one light emitting diode (LED) (or mini-LED, micro-LED, or the like). For example, the mini-LED may be a small LED including a light source chip having a size of about 100 to about 500 μm. A light source chip of the micro-LED may have a size of about 5 μm to about 10 μm, but the disclosure is not limited thereto. The light source blocks LB may be arranged on the substrate 110, and correspond to a display area of the display panel 400. Since the light source blocks LB include mini-LEDs or micro-LEDs as described above, they may have a thickness similar to that in an edge illumination type backlight structure even in a direct type backlight structure, may have a high dynamic range (HDR) that cannot be implemented in the edge illumination type backlight structure, and can readily perform local dimming.

The power supply parts 120 may be mounted on the printed circuit boards 140 disposed on at least one side of the substrate 110, and supply driving voltages to the light source blocks LB. For example, the power supply parts 120 may receive feedback voltages from the light source drivers 130. The power supply parts 120 may generate driving voltages based on the feedback voltages, and supply the driving voltages to the light source blocks LB. For example, each of the power supply parts 120 may include at least one inductor, a capacitor, a diode, a transistor, an integrated circuit, and a voltage source, but the disclosure is not limited thereto.

The power supply parts 120 may supply the driving voltages to the light source blocks LB through power supply lines, and the power supply lines may electrically connect the power supply parts 120 to the light source blocks LB via the flexible films 150.

The light source drivers 130 may be mounted on the printed circuit boards 140 disposed on at least one side of the substrate 110 to drive the light source blocks LB. The light source drivers 130 may control a current flowing through the light source blocks LB by controlling switching transistors connected in series to the light source blocks LB. For example, the light source drivers 130 may independently control each of the light source blocks LB to readily perform local dimming. Thus, a contrast ratio may be improved, and power consumed (or power consumption) by the light source blocks LB may be reduced.

The light source drivers 130 may be electrically connected to the light source blocks LB through sensing lines, and the sensing lines may electrically connect the light source blocks LB to the light source drivers 130 via the flexible films 150. For example, at least some of the sensing lines may be finely patterned and highly densely arranged on the substrate 110.

The power supply parts 120 and the light source drivers 130 may be mounted on the printed circuit boards 140. The power supply lines electrically connected to the power supply parts 120 and the sensing lines electrically connected to the light source drivers 130 may be further mounted on the printed circuit boards 140. According to an example, the printed circuit boards 140 may be bent together with the flexible films 150, and a bezel area of the display device 10 may be reduced. For example, the printed circuit boards 140 may be implemented with, for example, a single substrate on which all of the power supply parts 120 and the light source drivers 130 may be mounted. For example, the printed circuit boards 140 may be implemented with, for example, multiple substrates, and groups into which the power supply parts 120 and the light source drivers 130 are divided may be mounted on the printed circuit boards 140, respectively. The printed circuit boards 140 may have various configurations according to the arrangement structure of the power supply parts 120 and the light source drivers 130 and a method of driving the light source blocks LB.

Each of the flexible films 150 may connect a printed circuit board 140 to the substrate 110. For example, terminals provided on a side of each of the flexible films 150 may be attached to the printed circuit board 140 by a film attaching process, and terminals provided on another side of each of the flexible films 150 may be attached to the substrate 110 by a film attaching process. According to an example, each of the flexible films 150 may be bent, and reduce a bezel area of the display device 10. For example, each of the flexible films 150 may be formed of a tape carrier package (TCP), a chip on flexible board, or a chip on film (COF).

The diffuser plate 200 may be disposed on a front surface of the backlight unit 100. For example, the diffuser plate 200 may be supported by an upper surface of a bottom case 510, and the backlight unit 100 may be disposed on a bottom surface of the bottom case 510. Thus, a space may be formed between the diffuser plate 200 and the backlight unit 100. According to an embodiment, the diffuser plate 200 may be made of a material having a higher light diffusivity than that of the optical sheet part 300. Since the diffuser plate 200 is interposed between the backlight unit 100 and the optical sheet part 300 as described above, the diffusion of light emitted from the light source blocks LB may be improved.

The optical sheet part 300 may be disposed on a rear surface of the display panel 400. For example, the optical sheet part 300 may be interposed between the diffuser plate 200 and the display panel 400 and improve luminance characteristics of light emitted from the light source blocks LB. According to an example, the optical sheet part 300 may be a composite optical sheet having both a function of diffusing incident light and a function of condensing the diffused light.

According to an example, the optical sheet part 300 may be attached to the rear surface of the display panel 400 by a lamination process using a transparent bonding member as a medium (e.g., adhesives). The transparent bonding member may be an optically clear adhesive (OCA), an optically clear resin (OCR), a porous OCA, or a porous OCR. In another embodiment, in case that the optical sheet part 300 is formed of a composite optical sheet, it may further include light condensing patterns including prism or lenticular patterns.

The display panel 400 may include a lower substrate 410, an upper substrate 420, flexible films 430, source driving circuits 440, a source circuit board 450, and a timing controller 460.

The lower substrate 410 and the upper substrate 420 may be made of glass or plastic. The lower substrate 410 may be larger in size than the upper substrate 420. Therefore, the flexible films 430 may be attached to an edge of an upper surface of the lower substrate 410, which is not covered by the upper substrate 420. For example, the flexible films 430 may be attached to the edge of the upper surface of the lower substrate 410 by a film attaching process. The upper surface of the lower substrate 410 may face the upper substrate 420.

Signal lines and pixels may be provided on the upper surface of the lower substrate 410 of the display panel 400. For example, the signal lines may include data lines, gate lines, a common voltage line, and a scan control limes. The data lines and gate lines may intersect each other. The common voltage line may supply a common voltage to a common electrode (not illustrated). The scan control lines may supply control signals to a gate driving circuit.

A black matrix and color filters may be provided on a lower surface of the upper substrate 420 of the display panel 400. The lower surface of the upper substrate 420 may face the lower substrate 410. For another example, in case that the display panel 400 is formed using a color filter on TFT array (COT), the black matrix and the color filters may be provided on the upper surface of the lower substrate 410.

The common electrode may be provided on the lower surface of the upper substrate 420 in a vertical electric field driving method such as a twisted nematic (TN) mode, or a vertical alignment (VA) mode. The common electrode (not illustrated) may be provided on the upper surface of the lower substrate 410 in a horizontal electric field driving method such as an in plane switching (IPS) mode or a fringe field switching (FFS) mode. An alignment layer (not illustrated) may set a pretilt angle of liquid crystals, and may be formed on the upper surface of the lower substrate 410 and the lower surface of the upper substrate 420 of the display panel 400.

A lower polarizing plate may be attached to a lower surface of the lower substrate 410 of the display panel 400. A transparent electrode may be formed on the entire upper surface of the upper substrate 420 of the display panel 400, and an upper polarizing plate may be attached onto the transparent electrode. The transparent electrode may be electrically connected to a ground (e.g., ground potential) in order to discharge static electricity generated in the upper substrate 420 of the display panel 400.

The display panel 400 may further include a liquid crystal layer (not illustrated) interposed between the lower substrate 410 and the upper substrate 420. The liquid crystal layer may be driven by an electric field generated by a potential difference between a data voltage supplied to each pixel electrode and the common voltage supplied to the common electrode. Accordingly, the transmitted amount of light incident from the backlight unit 100 may be adjusted.

Each of the flexible films 430 may electrically connect the source circuit board 450 to the lower substrate 410. For example, input terminals provided on a side of each of the flexible films 430 may be attached to the source circuit board 450 by a film attaching process, and output terminals provided on another side of each of the flexible films 430 may be attached to a pad part of the lower substrate 410 by a film attaching process. According to an embodiment, each of the flexible films 430 may be bent to reduce the bezel area of the display device 10. For example, each of the flexible films 430 may be formed of a tape carrier package (TCP) or a chip on flexible board or a chip on film (COP).

The source driving circuits 440 may be individually mounted on the flexible films 430, respectively. Each of the source driving circuits 440 may receive pixel data and a data control signal from the timing controller 460, and convert the pixel data into an analog data signal for each pixel according to the data control signal. Each of the source driving circuits 440 may supply the data signal (e.g., analog data signal) to a corresponding data line.

The source circuit board 450 may support the timing controller 460 and transmit signals and power (e.g., driving power) output from the timing controller 460. The source circuit board 450 may provide signals and driving power supplied from the timing controller 460 to the source driving circuits 440 and a scan driver (not illustrated) in order to display an image in each pixel. To this end, signal transmission wirings and various power wirings may be provided on the source circuit board 450. For example, one or more source circuit boards 450 may be provided according to the number of flexible films 430.

The timing controller 460 may be mounted on the source circuit board 450 and may receive image data and a timing synchronization signal provided from a display driving system through a user connector provided on the source circuit board 450. The timing controller 460 may align the image data in a pixel arrangement structure and generate the pixel data based on the timing synchronization signal. The timing controller 460 may provide the generated pixel data to a corresponding source driving circuit 440. The timing controller 460 may generate the data control signal and a scan control signal based on the timing synchronization signal. The timing controller 470 may control a driving timing of each of the source driving circuits 440 through the data control signal, and control a driving timing of the scan driver through the scan control signal. The scan control signal may be supplied to the scan driver through a first or/and last flexible film among the flexible films 430 and a non-display area.

The case member 500 may include the bottom case 510, a support frame 520, and a top case 530.

The bottom case 510 may be manufactured as a quadrangular metal frame and accommodate (or receive) the backlight unit 100. For example, the backlight unit 100 may be disposed on the bottom surface of the bottom case 510, and the diffuser plate 200 may be disposed on the upper surface of the bottom case 510. Thus, a space may be formed between the backlight unit 100 and the diffuser plate 200. The bottom case 510 may be manufactured using a high-strength steel sheet to support and protect the backlight unit 100. For example, the bottom case 510 may be manufactured using an electro-galvanized steel sheet (EGI), stainless steel (SUS), galvalume (SGLC), an aluminum-plated steel sheet (aka ALCOSTA), a tin-plated steel sheet (SPTE), or the like.

The support frame 520 may support the lower surface of the lower substrate 410 of the display panel 400. The support frame 520 may be coupled to (or combined with) the bottom case 510 through a coupling member. For example, the support frame 520 and the bottom case 510 may be made of (or include) a same material, but the disclosure is not limited thereto.

According to an example, the support frame 520 and the bottom case 510 may be integral with each other. According to another example, the support frame 520 may be omitted, and the top case 530 may be coupled (e.g., directly coupled or directly combined) to the bottom case 510.

The top case 530 may cover edges of the display panel 400, upper and side surfaces of the support frame 520, and side surfaces of the bottom case 510. For example, the top case 530 and the bottom case 510 (and/or the support frame 520) may be made of (or include) a same material, but the disclosure is not limited thereto. The top case 530 may be coupled to (e.g., combined with) the support frame 520 through coupling members such as hooks or screws.

Figure 2:
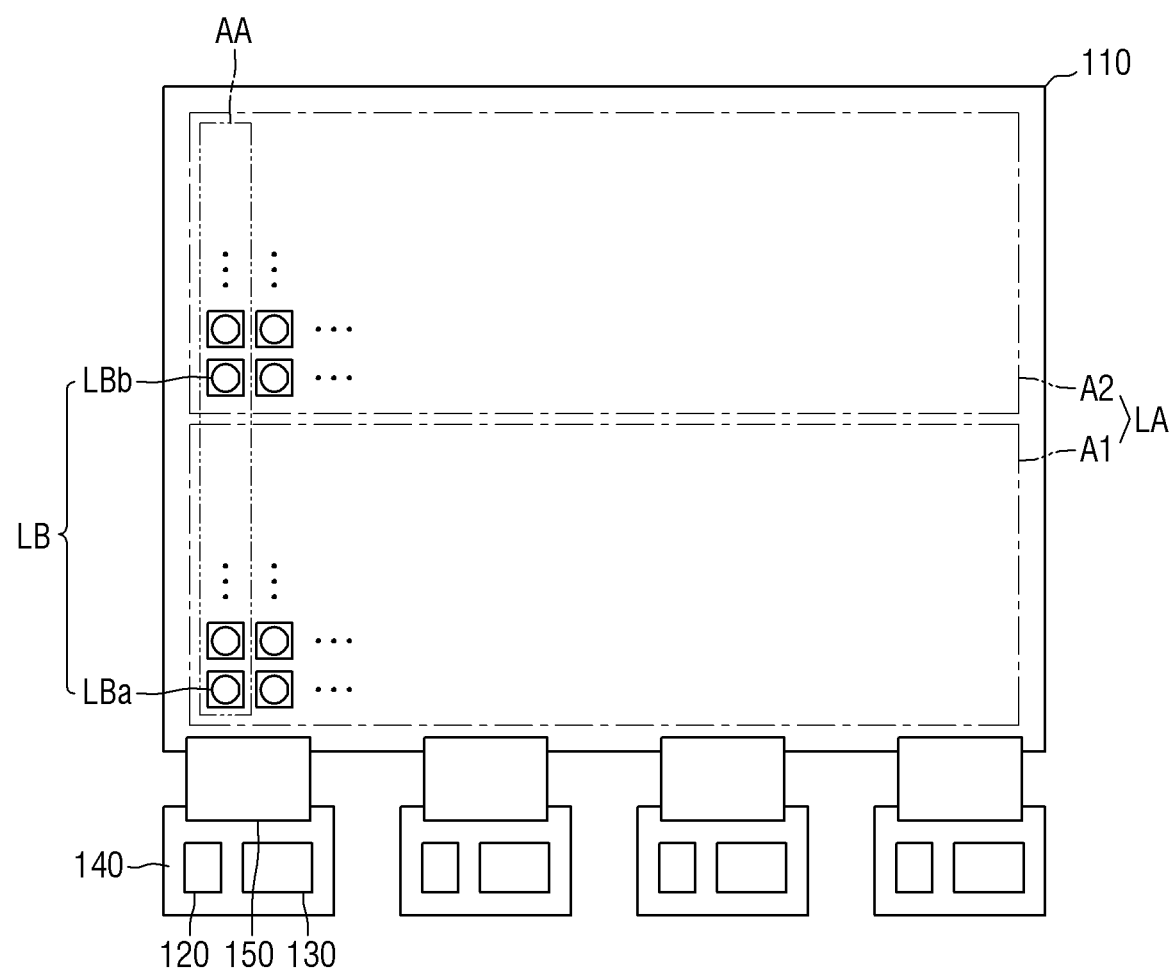
FIG. 2 is a schematic plan view of a backlight unit according to a first embodiment in the display device illustrated in FIG. 1.
Figure 3:
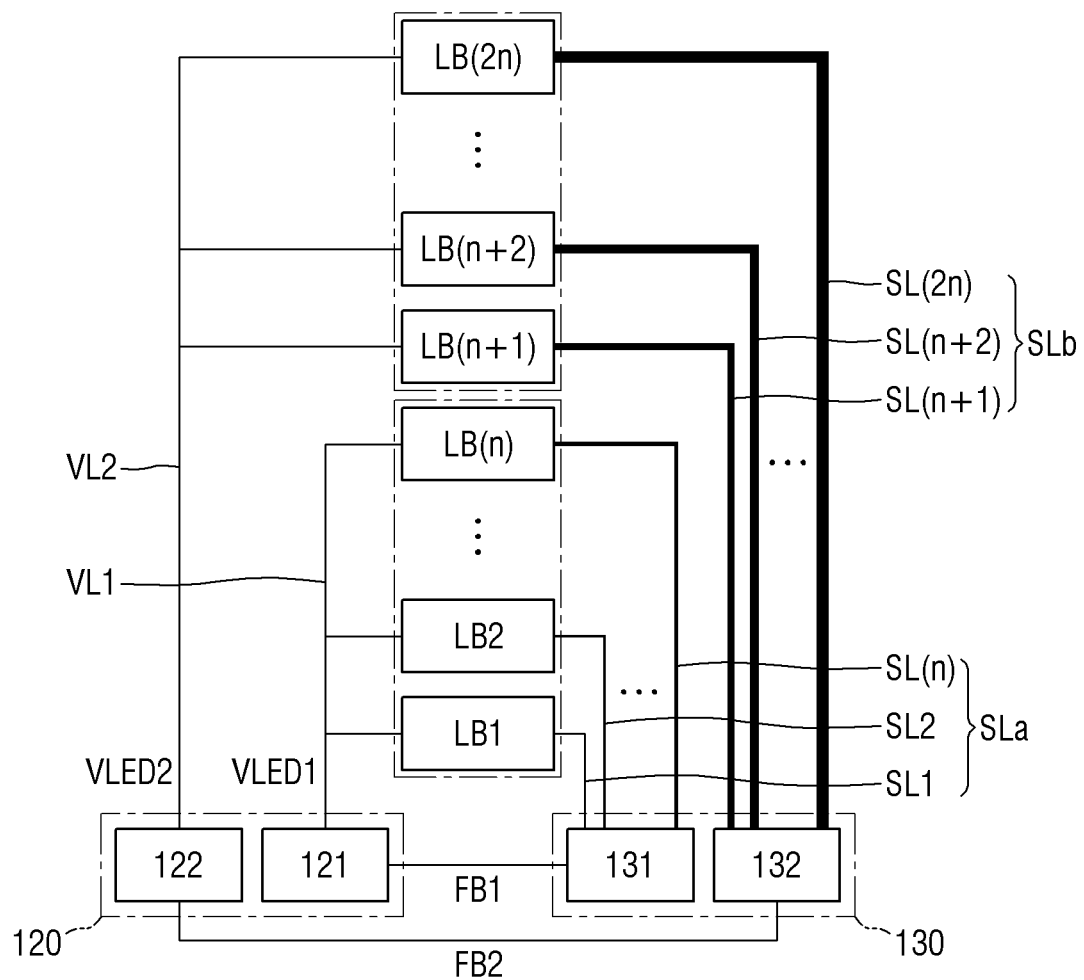
FIG. 3 is a schematic diagram illustrating an area AA of FIG. 2 and a connection relationship in the area AA.
Figure 4:
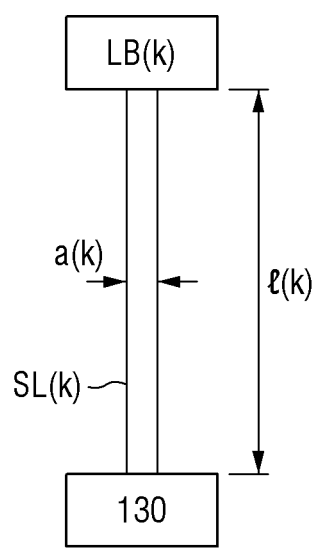
FIG. 4 is a schematic diagram illustrating resistance values of sensing lines illustrated in FIG. 3.

FIG. 2 is a schematic plan view of a backlight unit according to a first embodiment in the display device illustrated in FIG. 1. FIG. 3 is a schematic diagram illustrating an area AA of FIG. 2 and a connection relationship in the area AA. FIG. 4 is a schematic diagram illustrating resistance values of sensing lines illustrated in FIG. 3.

Referring to FIGS. 2 to 4, a substrate 110 may include a light emitting area LA composed of light source blocks LB. The light emitting area LA may include a first area A1 including light source blocks LBa (e.g., LB1 to LB(n)) and a second area A2 including light source blocks LBb (e.g., LB(n+1) to LB(2n)). According to an example, the first area A1 may be closer to power supply parts 120 and light source drivers 130 mounted on printed circuit boards 140 than the second area A2. For example, a distance between the light source blocks LBa (e.g., LB1 to LB(n)) of the first area A1 and the light source drivers 130 may be smaller than a distance between the light source blocks LBb (e.g., LB(n+1) to LB(2n)) of the second area A2 and the light source drivers 130. Therefore, a length of each of first sensing lines SLa (e.g., SL1 to SL(n)) electrically connected between the light source blocks LBa (e.g., LB1 to LB(n)) of the first area A1 and a first light source driver 131 may be smaller than a length of each of second sensing lines SLb (e.g., SL(n+1) to SL(2n)) electrically connected between the light source blocks LBb (e.g., LB(n+1) to LB(2n)) of the second area A2 and a second light source driver 132.

Each of the power supply parts 120 may include first and second power supply parts 121 and 122, and each of the light source drivers 130 may include the first and second light source drivers 131 and 132.

The first power supply part 121 may supply a first driving voltage VLED1 to the light source blocks LBa (e.g., LB1 to LB(n)) of the first area A1 through first power supply lines VL1, and the second power supply part 122 may supply a second driving voltage VLED2 to the light source blocks LBb (e.g., LB(n+1) to LB(2n)) of the second area A2 through second power supply lines VL2. For example, the first power supply part 121 may receive a first feedback voltage FB1 from the first light source driver 131 and generate the first driving voltage VLED1 based on the first feedback voltage FB1. The second power supply part 122 may receive a second feedback voltage FB2 from the second light source driver 132 and generate the second driving voltage VLED2 based on the second feedback voltage FB2.

According to an example, the first power supply lines VL1 may be respectively connected (e.g., electrically connected) to first to $n^{th}$ light source blocks LB1 to LB(n), and may have a same resistance value. The second power supply lines VL2 may be respectively connected (e.g., electrically connected) to $(n+1)^{th}$ to $(2n)^{th}$ light source blocks LB(n+1) to LB(2n), and may have a same resistance value. Therefore, the backlight unit 100 according to the disclosure may minimize power consumed (or power consumption) in the first and second power supply lines VL1 and VL2.

The first light source driver 131 may control a current flowing through the light source blocks LBa (e.g., LB1 to LB(n)) of the first area A1 through the first sensing lines SLa (e.g., SL1 to SL(n)). The second light source driver 132 may control a current flowing through the light source blocks LBb (e.g., LB(n+1) to NL(2n)) of the second area A2 through the second sensing lines SLb (e.g., SL(n+1) to SL(2n)).

According to an example, the number of light source blocks LBa (e.g., LB1 to LB(n)) of the first area A1 may be equal to the number of light source blocks LBb (e.g., LB(n+1) to LB(2n)) of the second area A2. However, the disclosure is not limited thereto. For example, the first area A1 may include the first to $n^{th}$ (where n is a natural number of 2 or more) light source blocks LB1 to LB(n), and the second area A2 may include the $(n+1)^{th}$ to $(2n)^{th}$ light source blocks LB(n+1) to LB(2n). The first to $n^{th}$ light source blocks LB1 to LB(n) of the first area A1 may be electrically connected to the first light source driver 131 through first sensing lines SL1 to SL(n), respectively, and the $(n+1)^{th}$ to $(2n)^{th}$ light source blocks LB(n+1) to LB(2n) of the second area A2 may be electrically connected to the second light source driver 132 through second sensing lines SL(n+1) to SL(2n), respectively. For example, a length of each of the first sensing lines SL1 to SL(n) may be smaller than a length of each of the second sensing lines SL(n+1) to SL(2n).

For example, the first sensing line SL1 electrically connected to the first light source block LB1 may be shorter than the first sensing line SL2 electrically connected to the second light source block LB2. For example, the first sensing lines SL1 to SL(n) may be long or short according to distances between the first to $n^{th}$ light source blocks LB1 to LB(n) and the first light source driver 131, respectively. The second sensing line SL(n+1) electrically connected to the $(n+1)^{th}$ light source block LB(n+1) may be longer than each of the first sensing lines SL1 to SL(n) and may be shorter than the second sensing line SL(n+2) electrically connected to the $(n+2)^{th}$ light source block LB(n+2). Similar to this, the second sensing lines SL(n+1) to SL(2n) may be relatively long or short according to distances between the $(n+1)^{th}$ to $(2n)^{th}$ light source blocks LB(n+1) to LB(2n) and the second light source driver 132, respectively.

In FIG. 4, a sensing line SL(k) connecting a light source block LB(k) (where k is a natural number of 1 to 2n) among the first to $(2n)^{th}$ light source blocks LB1 to LB(2n) to the light source driver 130 may have a resistance as shown in Equation 1 below:

$$R = \rho \frac{l}{a}. \quad (1)$$

In Equation 1, R is a self-resistance of a line (or wiring), p is a specific resistance according to a material of the line, l is a length of the line, and a is a cross-sectional area of the line. Therefore, the resistance of the sensing line SL(k) may decrease as the cross-sectional area a(k) increases. The resistance of the sensing line SL(k) may increase as the length l(k) increases.

The first sensing lines SL1 to SLn may have a same first resistance value. According to an example, the first sensing lines SL1 to SL(n) may have different lengths according to positions of the first to $n^{th}$ light source blocks LB1 to LB(n), respectively. Since the first sensing lines SL1 to SL(n) have different cross-sectional areas according to the lengths of the first sensing lines SL1 to SL(n), respectively, they may have the same first resistance value. Since the first sensing lines SL1 to SL(n) have the cross-sectional areas proportional to the distances between the light source blocks LBa (e.g., LB1 to LB(n)) of the first area A1 and the first light source driver 131, respectively, they may have the same first resistance value.

The second sensing lines SL(n+1) to SL(2n) may have a same second resistance value. According to an example, the second sensing lines SL(n+1) to SL(2n) may have different lengths according to positions of the $(n+1)^{th}$ to $(2n)^{th}$ light source blocks LB(n+1) to LB(2n), respectively. Since the second sensing lines SL(n+1) to SL(2n) have different cross-sectional areas according to the lengths of the second sensing lines SL(n+1) to SL(2n), respectively, they may have the same second resistance value. Since the second sensing lines SL(n+1) to SL(2n) have the cross-sectional areas proportional to the distances between the light source blocks LBb (e.g., LB(n+1) to LB(2n)) of the second area A2 and the second light source driver 132, respectively, they may have the same second resistance value.

Since the first sensing lines SL1 to SL(n) have the same resistance value as described above, the first driving voltage VLED1 provided from the first power supply part 121 may drop to a same voltage value in each of the first to $n^{th}$ light source blocks LB1 to LB(n), each of the first sensing lines SL1 to SL(n), and the first light source driver 131. For example, a voltage drop in each of the first light source block LB1, the first sensing line SL1 electrically connected to the first light source block LB1, and the first light source driver 131 may be the same as a voltage drop in each of the $n^{th}$ light source block LB(n), the first sensing line SL(n) electrically connected to the $n^{th}$ light source block LB(n), and the first light source driver 131.

Since the second sensing lines SL(n+1) to SL(2n) have the same second resistance value, the second driving voltage VLED2 provided from the second power supply part 122 may drop to a same voltage value in each of the $(n+1)^{th}$ to $(2n)^{th}$ light source blocks LB(n+1) to LB(2n), each of the second sensing lines SL(n+1) to SL(2n), and the second light source driver 132. For example, a voltage drop in each of the $(n+1)^{th}$ light source block LB(n+1), the second sensing line SL(n+1) electrically connected to the $(n+1)^{th}$ light source block LB(n+1), and the second light source driver 132 may be the same as a voltage drop in each of the $(2n)^{th}$ light source block LB(2n), the second sensing line SL(2n) electrically connected to the $(2n)^{th}$ light source block LB(2n), and the second light source driver 132.

In case that sensing lines have different resistance values and a same driving voltage is applied to light source blocks, different voltages may drop in the sensing lines, respectively. A high voltage drop may occur in some sensing lines having a high resistance value, and power consumption in the sensing lines may increase. A low voltage drop may occur in some other sensing lines having a low resistance value, and a high voltage drop may occur in a light source driver electrically connected to the sensing lines. Therefore, the light source driver in which a high voltage drop occurs may generate heat, and the efficiency of the backlight unit may be deteriorated.

Therefore, in order to solve the above problem, in the backlight unit 100 according to the disclosure, the first sensing lines SL1 to SL(n) may have the same first resistance value, and the second sensing lines SL(n+1) to SL(2n) may have the same second resistance value. The second sensing lines SL(n+1) to SL(2n) may be longer than the first sensing lines SL1 to SL(n), respectively, and the second resistance value may be higher than the first resistance value. The first power supply part 121 may supply the first driving voltage VLED1 to each of the first to $n^{th}$ light source blocks LB1 to LB(n) electrically connected to the first sensing lines SL1 to SL(n), respectively. The second power supply part 122 may supply the second driving voltage VLED2 higher than the first driving voltage VLED1 to each of the $(n+1)^{th}$ to $(2n)^{th}$ light source blocks LB(n+1) to LB(2n) electrically connected to the second sensing lines SL(n+1) to SL(2n), respectively. Therefore, in the backlight unit 100 according to the disclosure, power consumed (or power consumption) in the first sensing lines SL1 to SL(n) and the second sensing lines SL(n+1) to SL(2n) may be minimized, and heat generation of the first and second light source drivers 131 and 132 may be prevented. Thus, the efficiency of the backlight unit 100 may be improved.

Figure 5:
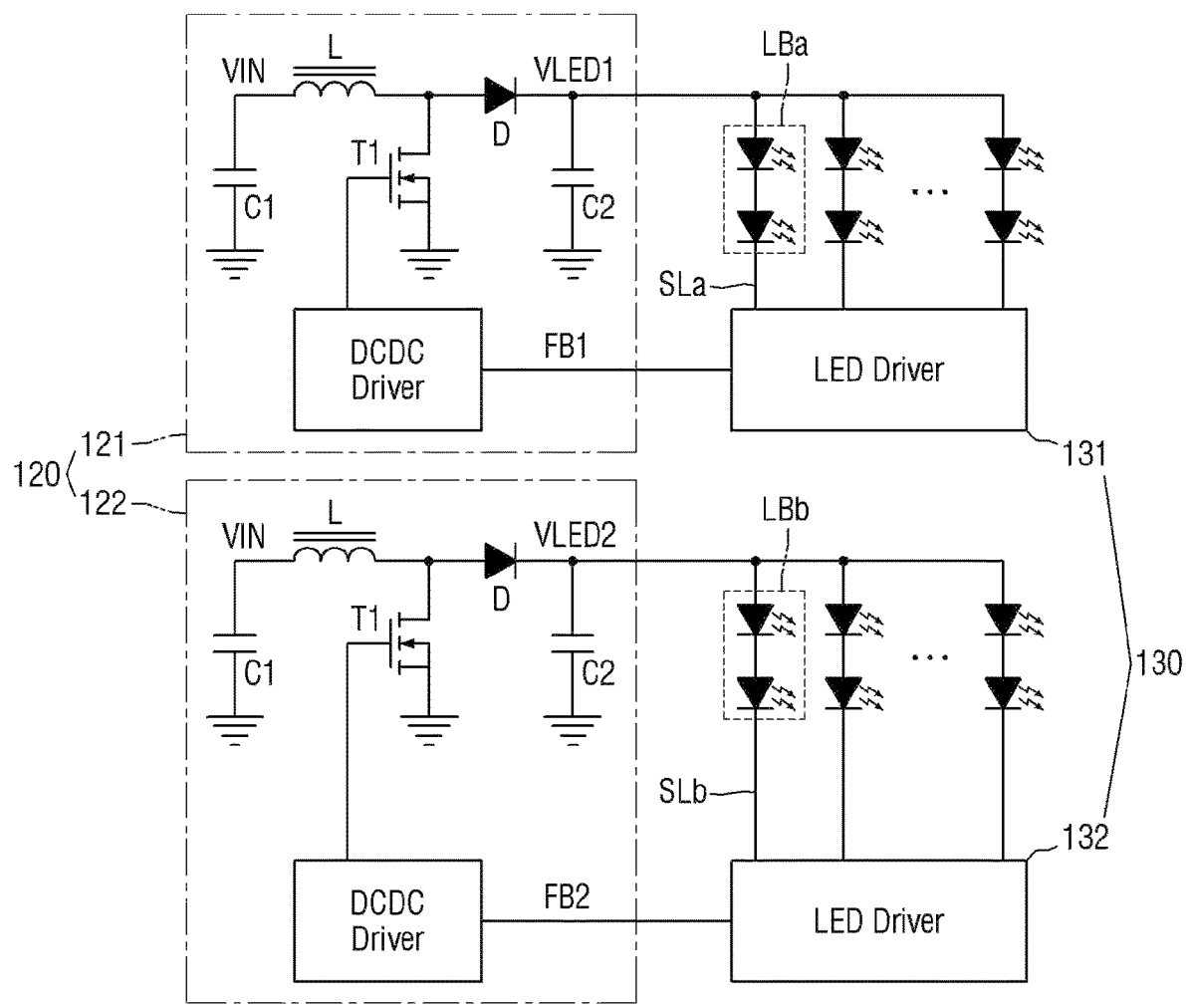
FIG. 5 is a schematic circuit diagram of an example of the backlight unit illustrated in FIG. 2.

FIG. 5 is a schematic circuit diagram of an example of the backlight unit illustrated in FIG. 2.

Referring to FIG. 5, the first power supply part 121 may boost a direct current (DC) voltage VIN, and output the first driving voltage VLED1. For example, the first power supply part 121 may include an inductor L and capacitors C1 and C2. According to an example, the first power supply part 121 may include a driving voltage controller DC-DC Driver. The driving voltage controller DC-DC Driver of the first power supply part 121 may turn on a first transistor T1 in response to the first feedback voltage FB1 received from the first light source driver 131. The driving voltage controller DC-DC Driver of the first power supply part 121 may adjust a turn-on time of the first transistor T1 based on the first feedback voltage FB1, and determine a magnitude of the first driving voltage VLED1. For example, the driving voltage controller DC-DC Driver of the first power supply part 121 may adjust the turn-on time of the first transistor T1 based on the first feedback voltage FB1. For example, in case that the driving voltage controller DC-DC Driver of the first power supply part 121 receives a low first feedback voltage FB1, the driving voltage controller DC-DC Driver of the first power supply part 121 may increase the turn-on time of the first transistor T1 and the magnitude of the first driving voltage VLED1. In case that the driving voltage controller DC-DC Driver of the first power supply part 121 receives a high first feedback voltage FB1, the driving voltage controller DC-DC Driver of the first power supply part 121 may reduce the turn-on time of the first transistor T1 and the magnitude of the first driving voltage VLED1. Thus, the generated first driving voltage VLED1 may be supplied in parallel to the light source blocks LBa disposed in the first area A1. The first driving voltage VLED1 may be dropped by each of the first to $n^{th}$ light source blocks LBa, each of the first sensing lines SLa, and the first light source driver 131.

Figure 6:
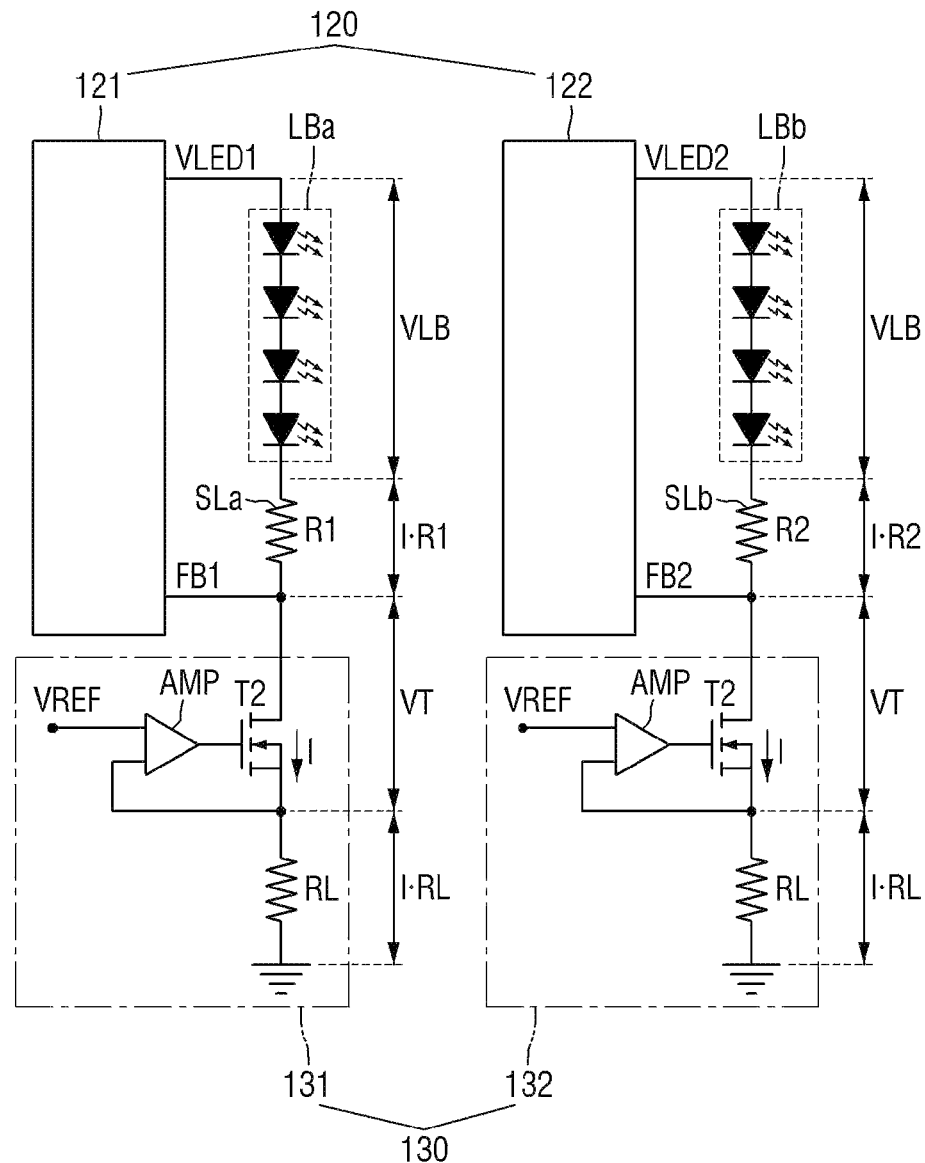
FIG. 6 is a schematic circuit diagram illustrating a voltage drop of the backlight unit illustrated in FIG. 2.

FIG. 6 is a schematic circuit diagram illustrating a voltage drop of the backlight unit illustrated in FIG. 2.

Referring to FIG. 6, the first driving voltage VLED1 may be dropped by each of the first to $n^{th}$ light source blocks LBa, each of the first sensing lines SLa, and the first light source driver 131. For example, the first light source driver 131 may include a second transistor T2 and an amplifier AMP electrically connected to a gate electrode of the second transistor T2. A first terminal of the amplifier AMP may receive a reference voltage VREF. A second terminal of the amplifier AMP may be electrically connected to a source electrode of the second transistor T2. An output terminal of the amplifier AMP may be electrically connected to the gate electrode of the second transistor T2. Therefore, the first light source driver 131 may control turn-on of the second transistor T2 so that a current I of a magnitude may flow through each of the first to $n^{th}$ light source blocks LBa, each of the first sensing lines SLa, and the first light source driver 131. For example, the first light source driver 131 may function as a current source.

The second driving voltage VLED2 may be dropped by each of the $(n+1)^{th}$ to $(2n)^{th}$ light source blocks LBb, each of the second sensing lines SLb, and the second light source driver 132. For example, the second light source driver 132 may include a second transistor T2 and an amplifier AMP electrically connected to a gate electrode of the second transistor T2. The second light source driver 132 may control turn-on of the second transistor T2 through the amplifier AMP so that a current I of a magnitude may flow through each of the $(n+1)^{th}$ to $(2n)^{th}$ light source blocks LBb, each of the second sensing lines SLb, and the second light source driver 132. For example, the second light source driver 132 may function as a current source.

For example, the first driving voltage VLED1 may be dropped by a voltage VLB applied to each of the first to $n^{th}$ light source blocks LBa, a voltage I×R1 applied to the first sensing lines SLa, a voltage VT applied to the second transistor T2, and a voltage I×RL applied to a load resistor RL (VLED1=VLB+I×R1+VT+I×RL). For example, the first driving voltage VLED1 supplied in parallel to the first to $n^{th}$ light source blocks LBa may drop to a same magnitude in all the first sensing lines SLa.

For example, the second driving voltage VLED2 may be dropped by a voltage VLB applied to each of the $(n+1)^{th}$ to $(2n)^{th}$ light source blocks LBb, a voltage I×R2 applied to the second sensing lines SLb, a voltage VT applied to the second transistor T2, and a voltage I×RL applied to a load resistor RL (VLED2=VLB+I×R2+VT+I×RL). For example, the second driving voltage VLED2 supplied in parallel to the $(n+1)^{th}$ to $(2n)^{th}$ light source blocks LBb may drop to a same magnitude in all the second sensing lines SLb.

Therefore, a difference between the first and second driving voltages VLED1 and VLED2 may correspond to a difference (VLED2−VLED1=I×R2−I×R1) between the voltage I×R1 applied to the first sensing lines SLa and the voltage I×R2 applied to the second sensing lines SLb.

As described above, since the first area A1 (e.g., refer to FIG. 2) of the substrate 110 is disposed closer to the power supply parts 120 and the light source drivers 130 than the second area A2 (e.g., refer to FIG. 2), the first sensing lines SL1 to SL(n) may have a same first resistance value R1, and the second sensing lines SL(n+1) to SL(2n) may have a same second resistance value R2, and the first resistance value R1 may be smaller than the second resistance value R2.

Therefore, the first power supply part 121 may supply the first driving voltage VLED1 smaller than the second driving voltage VLED2 to the first to $n^{th}$ light source blocks LB1 to LB(n) having the first resistance value R1. Thus, power consumed (or power consumption) in the first sensing lines SL1 to SL(n) may be reduced or minimized, and heat generation of the first light source driver 131 may be prevented.

Similarly, the second power supply part 122 may supply the second driving voltage VLED2 to each of the $(n+1)^{th}$ to $(2n)^{th}$ light source blocks LB(n+1) to LB(2n) respectively connected (e.g., electrically connected) to the second sensing lines SL(n+1) to SL(2n) having the second resistance value R2. Thus, power consumed (or power consumption) in the second sensing lines SL(n+1) to SL(2n) may be minimized, and heat generation of the second light source driver 132 may be prevented.

Figure 7:
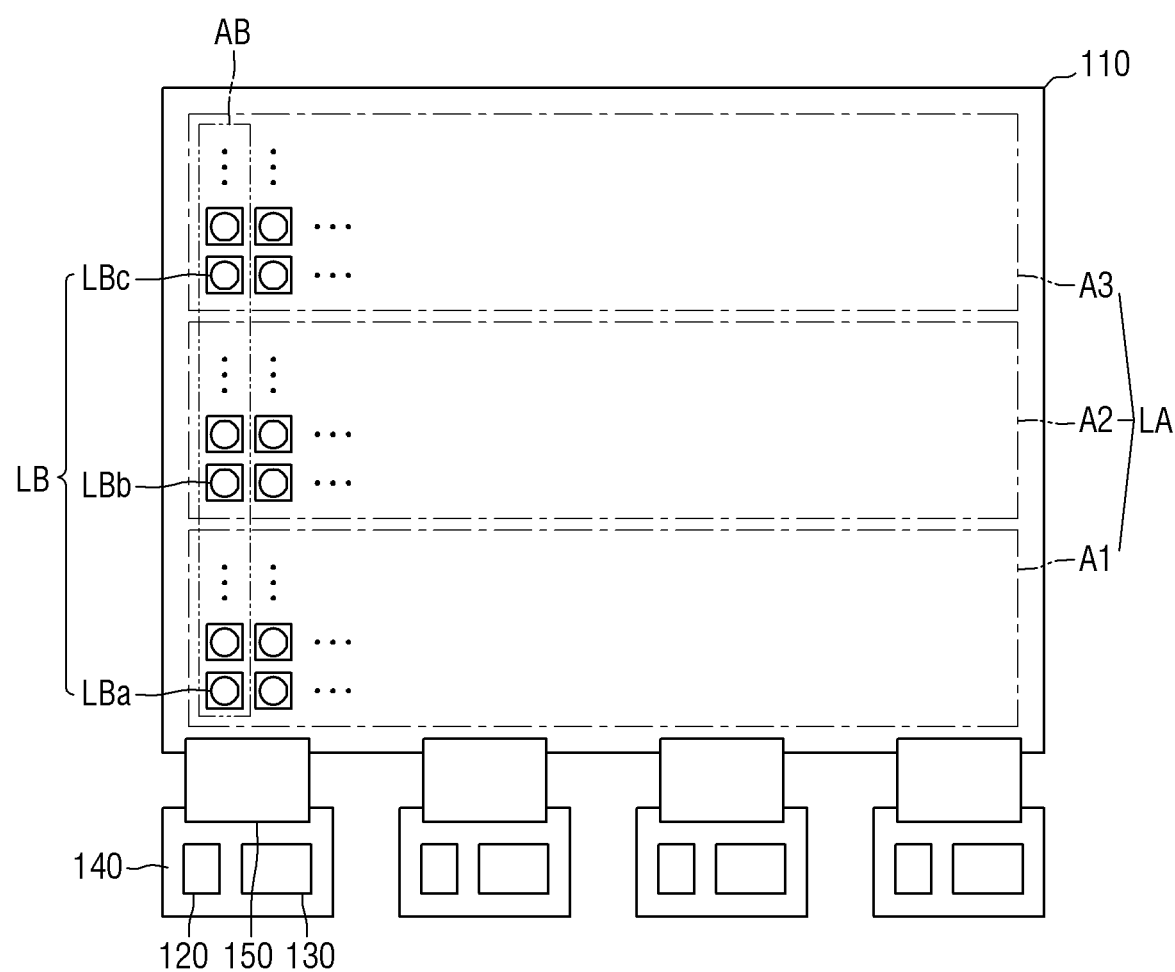
FIG. 7 is a schematic plan view of a backlight unit according to a second embodiment in the display device illustrated in FIG. 1.
Figure 8:
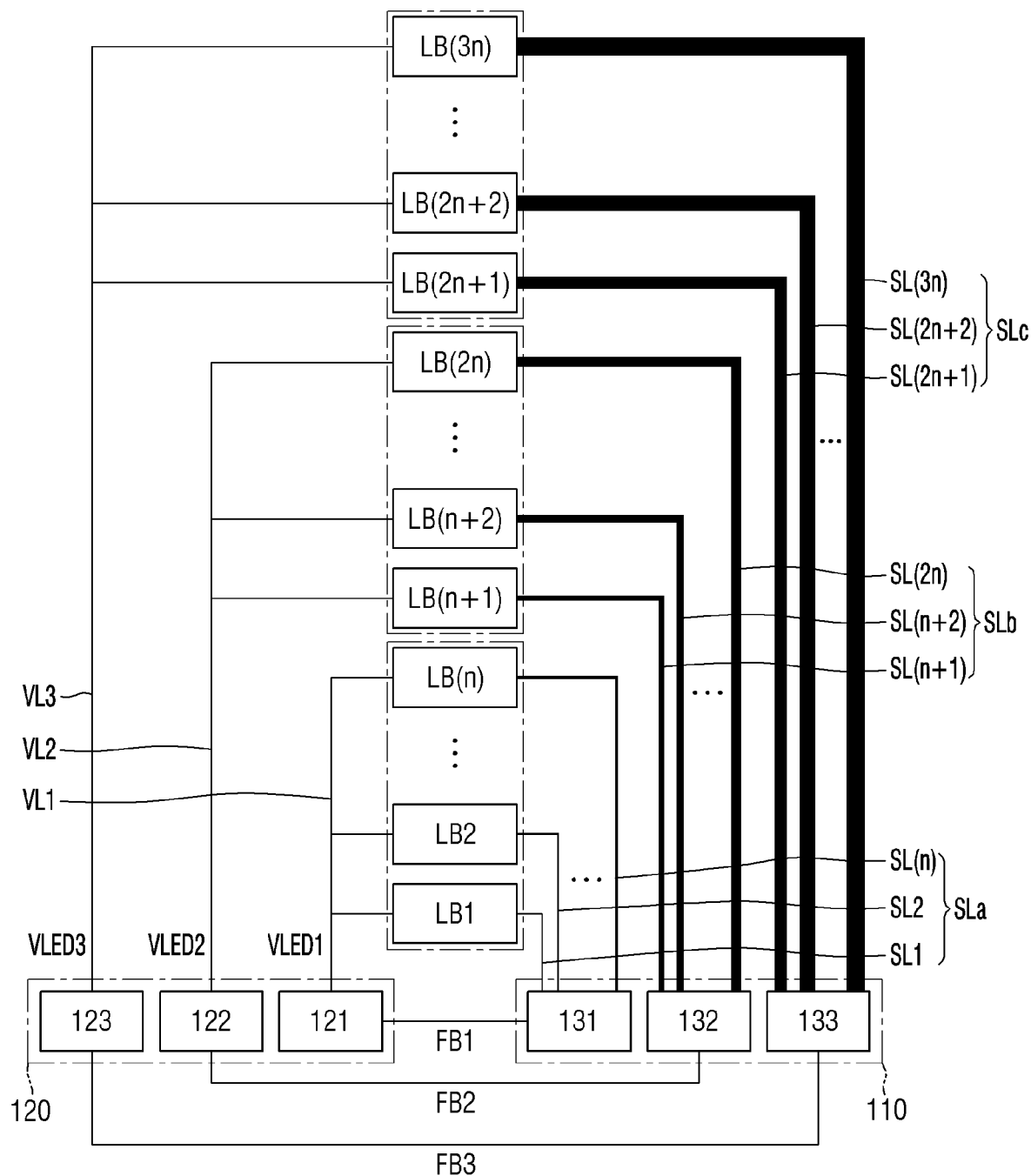
FIG. 8 is a schematic diagram illustrating an area of FIG. 7 and a connection relationship in the area.

FIG. 7 is a schematic plan view of a backlight unit according to a second embodiment in the display device illustrated in FIG. 1. FIG. 8 is a schematic diagram illustrating an area AB of FIG. 7 and a connection relationship in the area AB. Detailed descriptions of the same elements are omitted.

Referring to FIGS. 7 and 8, a substrate 110 may include a light emitting area LA composed of light source blocks LB. The light emitting area LA may include a first area A1 including light source blocks LBa (e.g., LB1 to LB(n)), a second area A2 including light source blocks LBb (e.g., LB(n+1) to LB(2n)), and a third area A3 including light source blocks LBc (e.g., LB(2n+1) to LB(3n)). According to an example, the first area A1 may be closer to power supply parts 120 and light source drivers 130 mounted on printed circuit boards 140 than the second area A2 and the third area A3, and the second area A2 may be closer to the power supply parts 120 and the light source drivers 130 than the third area A3. For example, a distance between the light source blocks LBa (e.g., LB1 to LB(n)) of the first area A1 and the light source drivers 130 may be smaller than a distance between the light source blocks LBb (e.g., LB(n+1) to LB(2n)) or LBc (e.g., LB(2n+1) to LB(3n)) of each of the second area A2 and the third area A3 and the light source drivers 130. Therefore, a length of each of first sensing lines SLa electrically connected between the light source blocks LBa (e.g., LB1 to LB(n)) of the first area A1 and a first light source driver 131 may be smaller than a length of each of second sensing lines SLb electrically connected between the light source blocks LBb (e.g., LB(n+1) to LB(2n)) of the second area A2 and a second light source driver 132. The length of each of the second sensing lines SLb electrically connected between the light source blocks LBb (e.g., LB(n+1) to LB(2n)) of the second area A2 and the second light source driver 132 may be smaller than a length of each of third sensing lines SLc electrically connected between the light source blocks LBc (e.g., LB(2n+1) to LB(3n)) of the third area A3 and a third light source driver 133.

Each of the power supply parts 120 may include first to third power supply parts 121 to 123, and each of the light source drivers 130 may include the first to third light source drivers 131 to 133.

The first power supply part 121 may generate a first driving voltage VLED1 based on a first feedback voltage FB1 and supply the first driving voltage VLED1 to the light source blocks LBa (e.g., LB1 to LB(n)) of the first area A1 through first power supply lines VL1. The second power supply part 122 may generate a second driving voltage VLED2 based on a second feedback voltage FB2 and supply the second driving voltage VLED2 to the light source blocks LBb (e.g., LB(n+1) to LB(2n)) of the second area A2 through second power supply lines VL2. The third power supply part 123 may generate a third driving voltage VLED3 based on a third feedback voltage FB3 and supply the third driving voltage VLED3 to the light source blocks LBc (e.g., LB(2n+1) to LB(3n)) of the third area A3 through third power supply lines VL3.

The first light source driver 131 may control a current flowing through the light source blocks LBa (e.g., LB1 to LB(n)) of the first area A1 through the first sensing lines SLa (e.g., SL1 to SL(n)). The second light source driver 132 may control a current flowing through the light source blocks LBb (e.g., LB(n+1) to LB(2n)) of the second area A2 through the second sensing lines SLb (e.g., SL(n+1) to SL(2n)). The third light source driver 133 may control a current flowing through the light source blocks LBc (e.g., LB(2n+1) to LB(3n)) of the third area A3 through the third sensing lines SLc (e.g., SL(2n+1) to LB(3n)).

For example, the first area A1 may include first to $n^{th}$ (where n is a natural number of 2 or more) light source blocks LB1 to LB(n). The second area A2 may include $(n+1)^{th}$ to $(2n)^{th}$ light source blocks LB(n+1) to LB(2n). The third area A3 may include $(2n+1)^{th}$ to $(3n)^{th}$ light source blocks LB(2n+1) to LB(3n). The first to $n^{th}$ light source blocks LB1 to LB(n) of the first area A1 may be electrically connected to the first light source driver 131 through first sensing lines SL1 to SL(n), respectively, the $(n+1)^{th}$ to $(2n)^{th}$ light source blocks LB(n+1) to LB(2n) of the second area A2 may be electrically connected to the second light source driver 132 through second sensing lines SL(n+1) to SL(2n), respectively, and the $(2n+1)^{th}$ to $(3n)^{th}$ light source blocks LB(2n+1) to LB(3n) of the third area A3 may be electrically connected to the third light source driver 133 through third sensing lines SL(2n+1) to SL(3n), respectively. For example, a length of each of the first sensing lines SL1 to SL(n) may be smaller than a length of each of the second sensing lines SL(n+1) to SL(2n) or a length of each of the third sensing lines SL(2n+1) to SL(3n).

Since the first sensing lines SL1 to SL(n) have different cross-sectional areas according to the lengths of the first sensing lines SL1 to SL(n), respectively, they may have a same first resistance value. Similarly, since the second sensing lines SL(n+1) to SL(2n) have different cross-sectional areas according to the lengths of the second sensing lines SL(n+1) to SL(2n), respectively, they may have a same second resistance value. Since the third sensing lines SL(2n+1) to SL(3n) have different cross-sectional areas according to the lengths of the third sensing lines SL(2n+1) to SL(3n), respectively, they may have a same third resistance value.

Since the first sensing lines SL1 to SL(n) have the same first resistance value as described above, the first driving voltage VLED1 provided from the first power supply part 121 may drop to a same voltage value in each of the first to $n^{th}$ light source blocks LB1 to LB(n), each of the first sensing lines SL1 to SL(n), and the first light source driver 131. For example, a voltage drop in each of the first light source block LB1, the first sensing line SL1 electrically connected to the first light source block LB1, and the first light source driver 131 may be the same as a voltage drop in each of the $n^{th}$ light source block LB(n), the first sensing line SL(n) electrically connected to the $n^{th}$ light source block LB(n), and the first light source driver 131.

Since the second sensing lines SL(n+1) to SL(2n) have the same second resistance value, the second driving voltage VLED2 provided from the second power supply part 122 may drop to a same voltage value in each of the $(n+1)^{th}$ to $(2n)^{th}$ light source blocks LB(n+1) to LB(2n), each of the second sensing lines SL(n+1) to SL(2n), and the second light source driver 132. For example, a voltage drop in each of the $(n+1)^{th}$ light source block LB(n+1), the second sensing line SL(n+1) electrically connected to the $(n+1)^{th}$ light source block LB(n+1), and the second light source driver 132 may be the same as a voltage drop in each of the $(2n)^{th}$ light source block LB(2n), the second sensing line SL(2n) electrically connected to the $(2n)^{th}$ light source block LB(2n), and the second light source driver 132.

Since the third sensing lines SL(2n+1) to SL(3n) have the same third resistance value, the third driving voltage VLED3 provided from the third power supply part 123 may drop to a same voltage value in each of the $(2n+1)^{th}$ to $(3n)^{th}$ light source blocks LB(2n+1) to LB(3n), each of the third sensing lines SL(2n+1) to SL(3n), and the third light source driver 133. For example, a voltage drop in each of the $(2n+1)^{th}$ light source block LB(2n+1), the third sensing line SL(2n+1) electrically connected to the $(2n+1)^{th}$ light source block LB(2n+1), and the third light source driver 133 may be the same as a voltage drop in each of the $(3n)^{th}$ light source block LB(3n), the third sensing line SL(3n) electrically connected to the $(3n)^{th}$ light source block LB(3n), and the third light source driver 133.

Therefore, the backlight unit 100 according to the second embodiment further includes the third power supply part 123 that applies the third driving voltage VLED3, the third sensing lines SL(2n+1) to SL(3n) having the third resistance value, and the third light source driver 130 that controls a current flowing through the third sensing lines SL(2n+1) to SL(3n), compared with the backlight unit according to the first embodiment. For example, the backlight unit 100 according to the second embodiment requires more elements than the backlight unit according to the first embodiment but can further reduce power consumption compared with the first embodiment and improve its efficiency by efficiently preventing heat generation of the first to third light source drivers 131 to 133.

Figure 9:
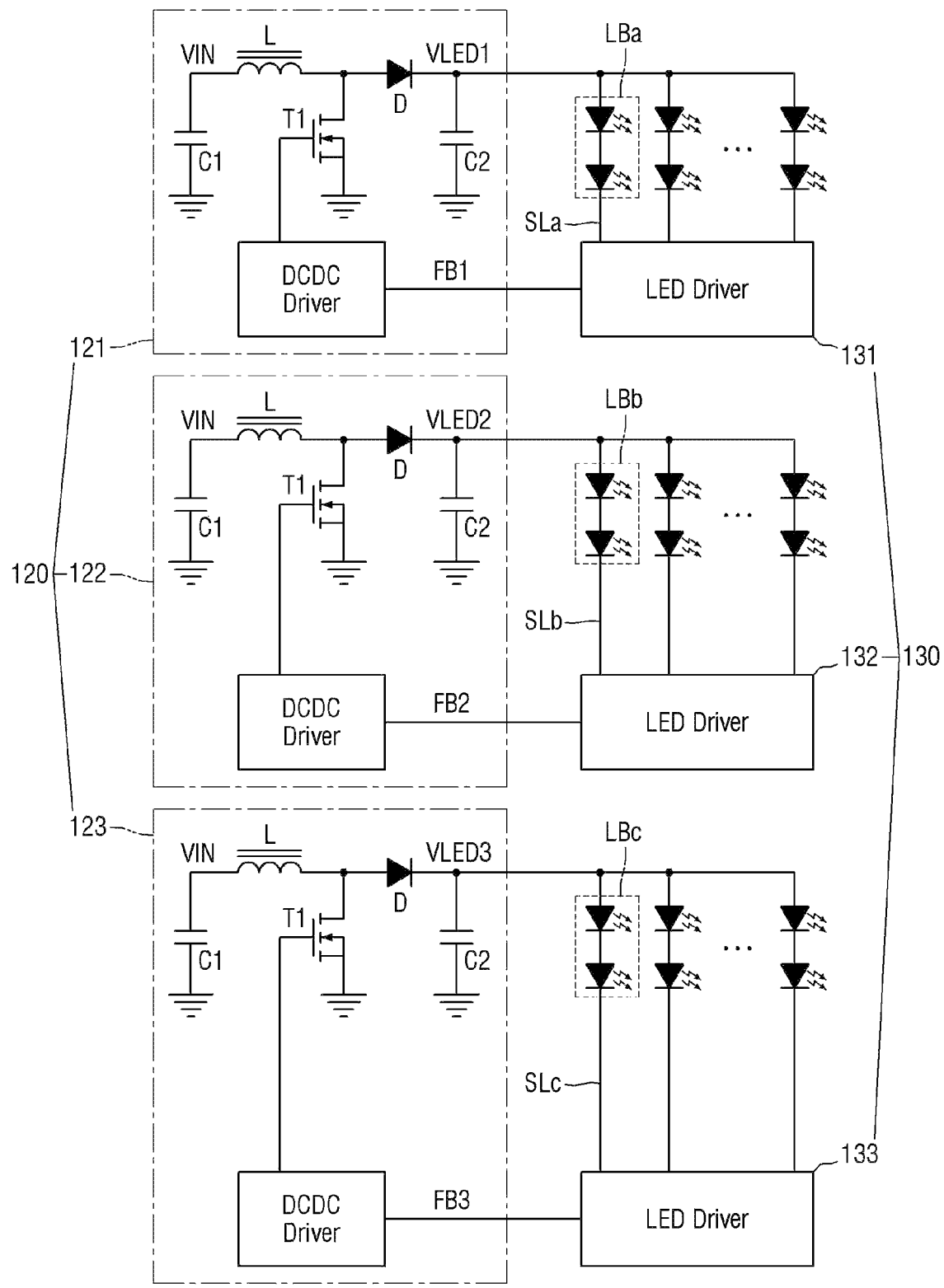
FIG. 9 is a schematic circuit diagram of an example of the backlight unit illustrated in FIG. 7.

FIG. 9 is a schematic circuit diagram of an example of the backlight unit illustrated in FIG. 7.

Referring to FIG. 9, the first power supply part 121 may boost a DC input voltage VIN, and output the first driving voltage VLED1. According to an example, the first power supply part 121 may include a driving voltage controller DC-DC Driver. The driving voltage controller DC-DC Driver of the first power supply part 121 may turn on a first transistor T1 in response to the first feedback voltage FB1 received from the first light source driver 131. The driving voltage controller DC-DC Driver of the first power supply part 121 may adjust the turn-on time of the first transistor T1 based on the first feedback voltage FB1, and determine a magnitude of the first driving voltage VLED1. For example, the driving voltage controller DC-DC Driver of the first power supply part 121 may adjust the turn-on time of the first transistor T1 based on the first feedback voltage FB1. Thus, the generated first driving voltage VLED1 may be supplied in parallel to the light source blocks LBa disposed in the first area A1.

The second power supply part 122 may boost a DC input voltage VIN and output the second driving voltage VLED2. According to an example, the second power supply part 122 may include a driving voltage controller DC-DC Driver. The driving voltage controller DC-DC Driver of the second power supply part 122 may turn on a first transistor T1 in response to the second feedback voltage FB2 received from the second light source driver 132. The driving voltage controller DC-DC Driver of the second power supply part 122 may adjust the turn-on time of the first transistor T1 based on the second feedback voltage FB2, and determine a magnitude of the second driving voltage VLED2. For example, the driving voltage controller DC-DC Driver of the second power supply part 122 may adjust the turn-on time of the first transistor T1 based on the second feedback voltage FB2. Thus, the generated second driving voltage VLED2 may be supplied in parallel to the light source blocks LBb disposed in the second area A2.

The third power supply part 123 may boost a DC input voltage VIN, and output the third driving voltage VLED3. According to an example, the third power supply part 123 may include a driving voltage controller DC-DC Driver. The driving voltage controller DC-DC Driver of the third power supply part 123 may turn on a first transistor T1 in response to the third feedback voltage FB3 received from the third light source driver 133. The driving voltage controller DC-DC Driver of the third power supply part 123 may adjust the turn-on time of the first transistor T1 based on the third feedback voltage FB3, and determine a magnitude of the third driving voltage VLED3. For example, the driving voltage controller DC-DC Driver of the third power supply part 123 may adjust the turn-on time of the first transistor T1 based on the third feedback voltage FB3. Thus, the generated third driving voltage VLED3 may be supplied in parallel to the light source blocks LBc disposed in the third area A3.

Figure 10:
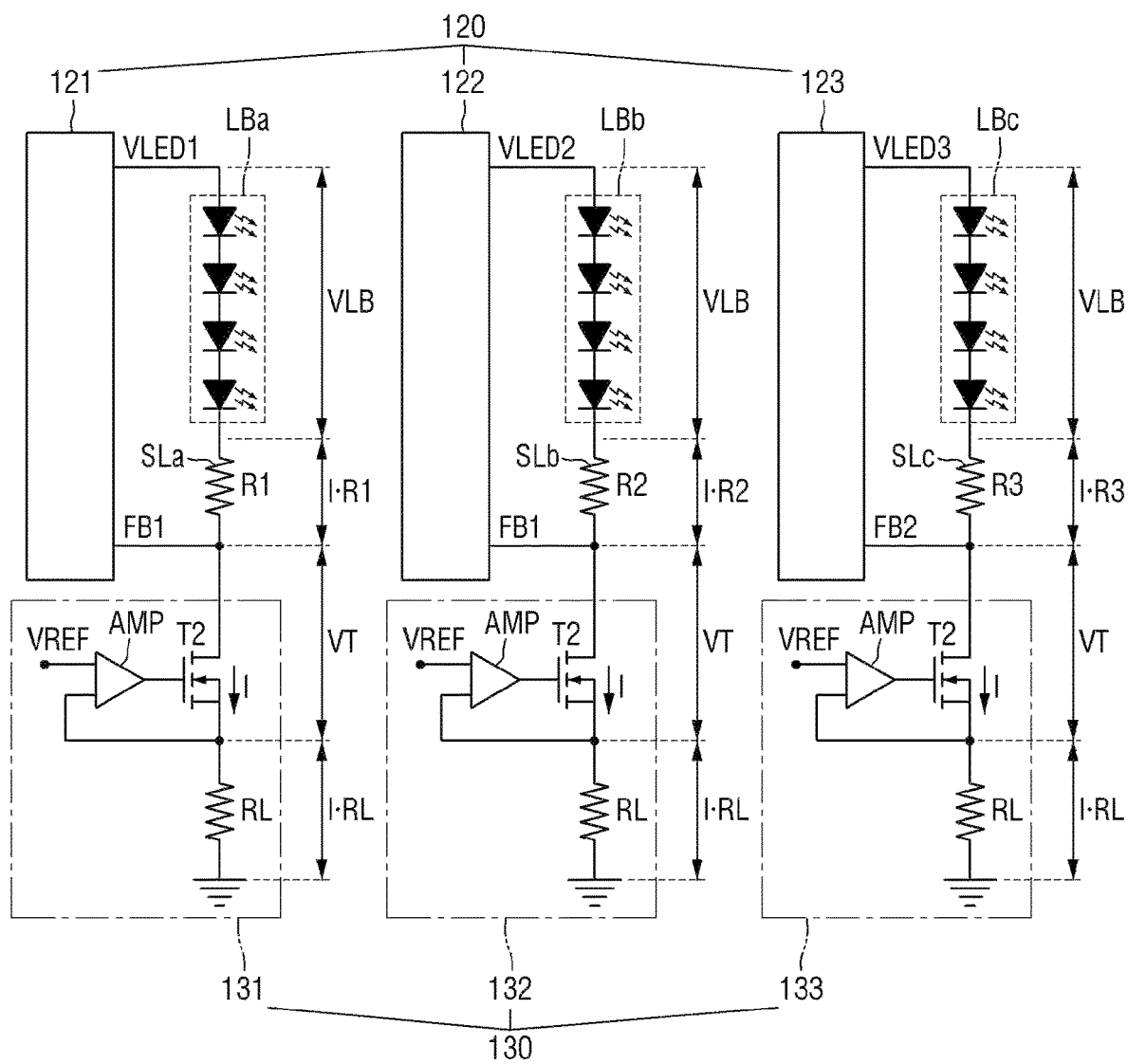
FIG. 10 is a schematic circuit diagram illustrating a voltage drop of the backlight unit illustrated in FIG. 7.

FIG. 10 is a schematic circuit diagram illustrating a voltage drop of the backlight unit illustrated in FIG. 7.

Referring to FIG. 10, the first driving voltage VLED1 may be dropped by each of the first to $n^{th}$ light source blocks LBa, each of the first sensing lines SLa, and the first light source driver 131. For example, the first light source driver 131 may include a second transistor T2 and an amplifier AMP electrically connected to a gate electrode of the second transistor T2. Therefore, the first light source driver 131 may control turn-on of the second transistor T2 through the amplifier AMP so that a current I of a magnitude may flow through each of the first to $n^{th}$ light source blocks LBa, each of the first sensing lines SLa, and the first light source driver 131.

The second driving voltage VLED2 may be dropped by each of the $(n+1)^{th}$ to $(2n)^{th}$ light source blocks LBb, each of the second sensing lines SLb, and the second light source driver 132. For example, the second light source driver 132 may include a second transistor T2 and an amplifier AMP electrically connected to a gate electrode of the second transistor T2. The second light source driver 132 may control turn-on of the second transistor T2 through the amplifier AMP so that a current I of a magnitude may flow through each of the $(n+1)^{th}$ to $(2n)^{th}$ light source blocks LBb, each of the second sensing lines SLb, and the second light source driver 132.

The third driving voltage VLED3 may be dropped by each of the $(2n+1)^{th}$ to $(3n)^{th}$ light source blocks LBc, each of the third sensing lines SLc, and the third light source driver 133. For example, the third light source driver 133 may include a second transistor T2 and an amplifier AMP electrically connected to a gate electrode of the second transistor T2. The third light source driver 133 may control the turn-on of the second transistor T2 through the amplifier AMP so that a current I of a magnitude may flow through each of the $(2n+1)^{th}$ to $(3n)^{th}$ light source blocks LBc, each of the third sensing lines SLc, and the third light source driver 133.

For example, the first driving voltage VLED1 may be dropped by a voltage VLB applied to each of the first to $n^{th}$ light source blocks LBa, a voltage I×R1 applied to the first sensing lines SLa, a voltage VT applied to the second transistor T2, and a voltage I×RL applied to a load resistor RL (VLED1=VLB+I×R1+VT+I×RL). For example, the first driving voltage VLED1 supplied in parallel to the first to $n^{th}$ light source blocks LBa may drop to a same magnitude in all the first sensing lines SLa.

For example, the second driving voltage VLED2 may be dropped by a voltage VLB applied to each of the $(n+1)^{th}$ to $(2n)^{th}$ light source blocks LBb, a voltage I×R2 applied to the second sensing lines SLb, a voltage VT applied to the second transistor T2, and a voltage I×RL applied to a load resistor RL (VLED2=VLB+I×R2+VT+I×RL). For example, the second driving voltage VLED2 supplied in parallel to the $(n+1)^{th}$ to $(2n)^{th}$ light source blocks LBb may drop to a same magnitude in all the second sensing lines SLb.

For example, the third driving voltage VLED3 may be dropped by a voltage VLB applied to each of the $(2n+1)^{th}$ to $(3n)^{th}$ light source blocks LBc, a voltage I×R3 applied to the third sensing lines SLc, a voltage VT applied to the second transistor T2, and a voltage I×RL applied to a load resistor RL (VLED3=VLB+I×R3+VT+I×RL). For example, the third driving voltage VLED3 supplied in parallel to the $(2n+1)^{th}$ to $(3n)^{th}$ light source blocks LBc may drop to a same magnitude in all the third sensing lines SLc.

Therefore, a difference between the first and second driving voltages VLED1 and VLED2 may correspond to a difference between the voltage I×R1 applied to the first sensing lines SLa and the voltage I×R2 applied to the second sensing lines SLb (VLED2−VLED1=I×R2−I×R1). A difference between the second and third driving voltages VLED2 and VLED3 may correspond to a difference between the voltage I×R2 applied to the second sensing lines SLb and the voltage I×R3 applied to the third sensing lines SLc (VLED3−VLED2=I×R3−I×R2).

As described above, since the first area A1 (e.g., refer to FIG. 7) of the substrate 110 is disposed closer to the power supply parts 120 and the light source drivers 130 than the second area A2 (e.g., refer to FIG. 7) and the third area A3 (e.g., refer to FIG. 7), the first sensing lines SL1 to SL(n) may have a same first resistance value R1, the second sensing lines SL(n+1) to SL(2n) may have a same second resistance value R2, and the third sensing lines SL(2n+1) to SL(3n) may have a same third resistance value R3. The first resistance value R1 may be smaller than the second resistance value R2, and the second resistance value R2 may be smaller than the third resistance value R3.

Therefore, the first power supply part 121 may supply the first driving voltage VLED1 smaller than the second driving voltage VLED2 and the third driving voltage VLED3 to the first to $n^{th}$ light source blocks LB1 to LB(n) having the first resistance value R1. Thus, power consumed (or power consumption) in the first sensing lines SL1 to SL(n) may be minimized, and heat generation of the first light source driver 131 may be prevented.

The second power supply part 122 may supply the second driving voltage VLED2, which is smaller than the third driving voltage VLED3, to the $(n+1)^{th}$ to $(2n)^{th}$ light source blocks LB(n+1) to LB(2n) having the second resistance value R2. Thus, power consumed (or power consumption) in the second sensing lines SL(n+1) to SL(2n) may be minimized, and heat generation of the second light source driver 132 may be prevented.

The third power supply part 123 may supply the third driving voltage VLED3 to each of the $(2n+1)^{th}$ to $(3n)^{th}$ light source blocks LB(2n+1) to LB(3n) respectively connected (e.g., electrically connected) to the third sensing lines SL(2n+1) to SL(3n) having the sane third resistance value R3. Thus, power consumed (or power consumption) in the third sensing lines SL(2n+1) to SL(3n) may be minimized, and heat generation of the third light source driver 133 may be prevented.

Figure 11:
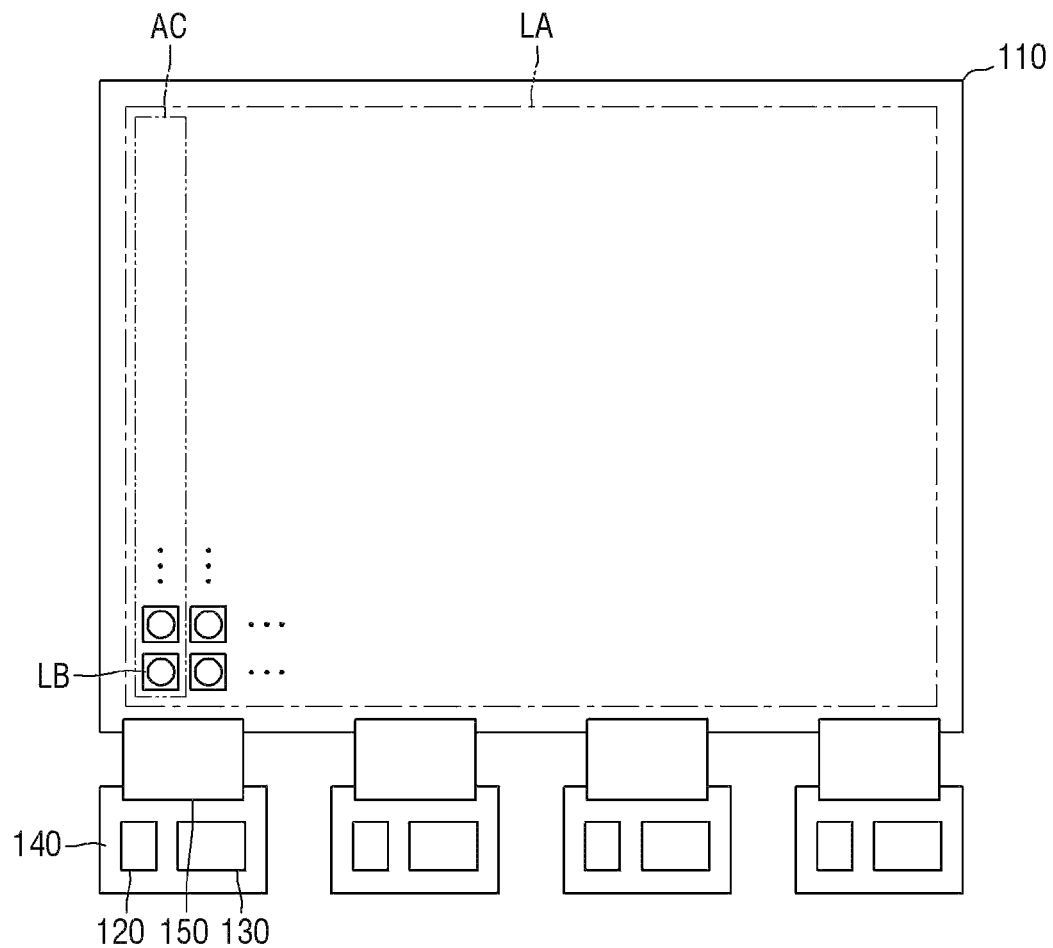
FIG. 11 is a schematic plan view of a backlight unit according to a third embodiment in the display device illustrated in FIG. 1.
Figure 12:
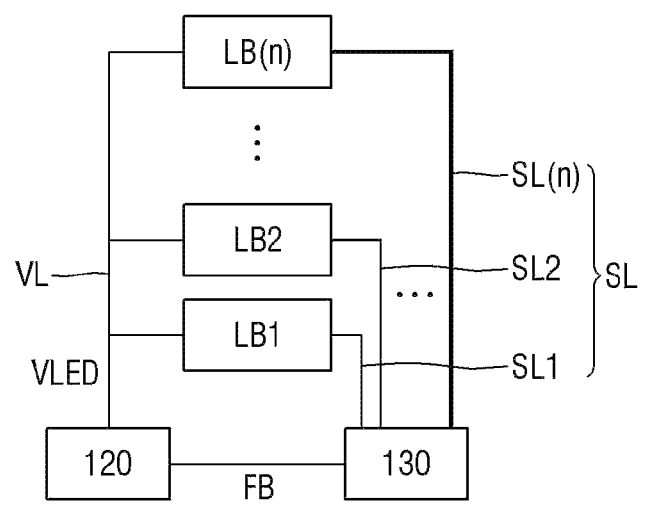
FIG. 12 is a schematic diagram illustrating an area of FIG. 11 and a connection relationship in the area.
Figure 13:
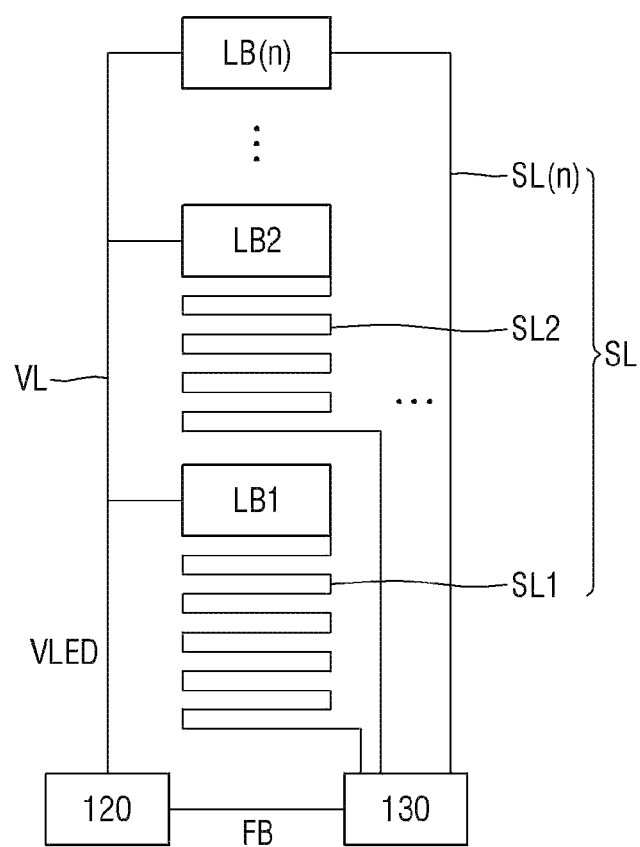
FIG. 13 is a schematic diagram of another example illustrating the area AC of FIG. 11 and the connection relationship in the area.

FIG. 11 is a schematic plan view of a backlight unit according to a third embodiment in the display device illustrated in FIG. 1. FIG. 12 is a schematic diagram illustrating an area AC of FIG. 11 and a connection relationship in the area AC. FIG. 13 is a schematic diagram of another example illustrating the area AC of FIG. 11 and the connection relationship in the area. AC. Detailed descriptions of the same elements are omitted.

Referring to FIGS. 11 and 12, a substrate 110 may include a light emitting area LA composed of light source blocks LB. The light emitting area LA may include first to $n^{th}$ (where n is a natural number of 2 or more) light source blocks LB1 to LB(n).

Each of power supply parts 120 may supply a driving voltage VLED to the light source blocks LB (e.g., LB1 to LB(n)) through power supply lines VL. For example, each of the power supply parts 120 may receive a feedback voltage from a light source driver 130 and generate the driving voltage VLED based on the feedback voltage FB.

According to an embodiment, the first power supply lines VL1 respectively connected (e.g., electrically connected) to the first to $n^{th}$ light source blocks LB1 to LB(n) may have a same resistance value. Therefore, the backlight unit 100 according to the disclosure may minimize power consumed (or power consumption) in the power supply lines VL.

Each of light source drivers 130 may control a current flowing through the light source blocks LB (e.g., LB1 to LB(n)) through sensing lines SL (e.g., SL1 to SL(n)). For example, the light emitting area LA may include the first to $n^{th}$ light source blocks LB1 through LB(n), and the first to $n^{th}$ light source blocks LB1 to LB(n) may be electrically connected to each of the light source drivers 130 through sensing lines SL1 to SL(n), respectively.

In FIG. 12, the sensing line SL1 electrically connected to the first light source block LB1 may be shorter than the sensing line SL2 electrically connected to the second light source block LB2. For example, the sensing lines SL1 to SL(n) may be long or short according to distances between the first to $n^{th}$ light source blocks LB1 to LB(n) and a light source driver 130, respectively.

The sensing lines SL1 to SLn may have a same resistance value. According to an example, the sensing lines SL1 to SL(n) may have different lengths according to positions of the first to $n^{th}$ light source blocks LB1 to LB(n), respectively. Since the sensing lines SL1 to SL(n) have different cross-sectional areas according to the lengths of the sensing lines SL1 to SL(n), respectively, they may have the same resistance value. Since the sensing lines SL1 to SL(n) have the cross-sectional areas proportional to the distances between the light source blocks LB (e.g., LB1 to LB(n)) and the light source driver 130, respectively, they may have a same resistance value.

In FIG. 13, a cross-sectional area and a length of the sensing line SL1 electrically connected to the first light source block LB1 may be the same as a cross-sectional area and a length of the sensing line SL2 electrically connected to the second light source block LB2. For example, since the sensing line SL1 electrically connected to the first light source block LB1 is closer to a light source driver 130 than the sensing line SL2 electrically connected to the second light source block LB2, it may be bent more than the sensing line SL2 electrically connected to the second light source block LB2. For example, since the sensing lines SL1 to SL(n) have the same cross-sectional area and the same length, they may have the same resistance value.

Since the sensing lines SL1 to SL(n) have the same resistance value as described above, the driving voltage VLED provided from a power supply part 120 may drop to the same voltage value in each of the first to $n^{th}$ light source blocks LB1 to LB(n), each of the sensing lines SL1 to SL(n), and a light source driver 130. For example, a voltage drop in each of the first light source block LB1, the sensing line SL1 electrically connected to the first light source block LB1, and the light source driver 130 may be the same as a voltage drop in each of the $n^{th}$ light source block LB(n), the sensing line SL(n) electrically connected to the $n^{th}$ light source block LB(n), and the light source driver 130.

Therefore, the backlight unit 100 according to the third embodiment may have an optimal structure, and include fewer elements than the first and second embodiments. Thus, the backlight unit 100 according to the third embodiment may have smaller power consumption than the backlight unit according to the first and second embodiment, and heat generation of the elements (e.g., sensing lines SL1 to SL(n), light source driver 130, or the like) may be prevented.

Figure 14:
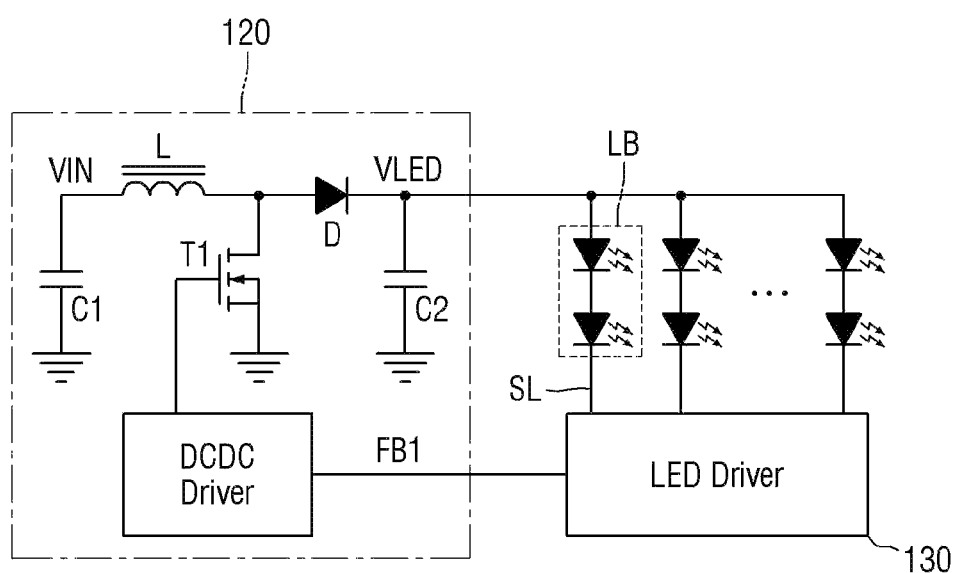
FIG. 14 is a schematic circuit diagram of an example of the backlight unit illustrated in FIG. 11.

FIG. 14 is a schematic circuit diagram of an example of the backlight unit illustrated in FIG. 11.

Referring to FIG. 14, the power supply part 120 may output the driving voltage VLED by boosting a DC input voltage VIN. According to an example, the power supply part 120 may include a driving voltage controller DC-DC Driver. The driving voltage controller DC-DC Driver may turn on a first transistor T1 in response to a feedback voltage FB received from the light source driver 130. The driving voltage controller DC-DC Driver may adjust a turn-on time of the first transistor T1 based on the feedback voltage FB, and determine a magnitude of the driving voltage VLED. Thus, the generated driving voltage VLED may be supplied in parallel to the light source blocks LB.

Figure 15:
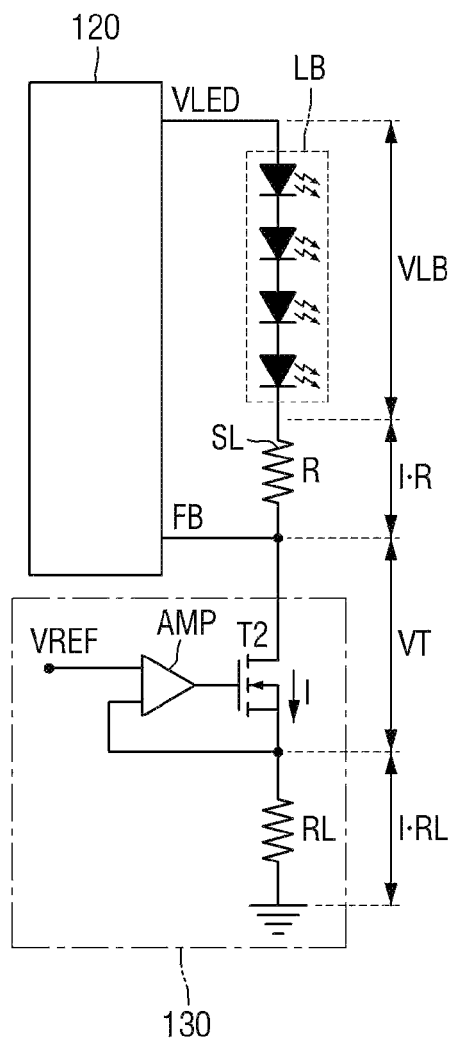
FIG. 15 is a schematic circuit diagram illustrating a voltage drop of the backlight unit illustrated in FIG. 11.

FIG. 15 is a schematic circuit diagram illustrating a voltage drop of the backlight unit illustrated in FIG. 11.

Referring to FIG. 15, the driving voltage VLED may be dropped by each of the first to $n^{th}$ light source blocks LB, each of the sensing lines SL, and a light source driver 130. For example, the light source driver 130 may include a second transistor T2 and an amplifier AMP electrically connected to a gate electrode of the second transistor T2. Therefore, the light source driver 130 may control the turn-on of the second transistor T2 through the amplifier AMP so that a current I of a magnitude may flow through each of the first to $n^{th}$ light source blocks LB, each of the first sensing lines SL, and the light source driver 130.

For example, the driving voltage VLED may be dropped by a voltage VLB applied to each of the first to $n^{th}$ light source blocks LB, a voltage I×R applied to the sensing lines SL, a voltage VT applied to the second transistor T2, and a voltage I×RL applied to a load resistor RL (VLED=VLB+I×R+VT+I×RL). For example, the driving voltage VLED supplied in parallel to the first to $n^{th}$ light source blocks LB may drop to a same magnitude in all the sensing lines SL.

Therefore, a power supply part 120 may supply the same driving voltage VLED to each of the first to $n^{th}$ light source blocks LB1 to LB(n) respectively connected (e.g., electrically connected) to the sensing lines SL1 to SL(n) having a same resistance value R. Thus, power consumed (or power consumption) in the sensing lines SL1 to SL(n) may be minimized, and heat generation of the light source driver 130 may be prevented.

Figure 16:
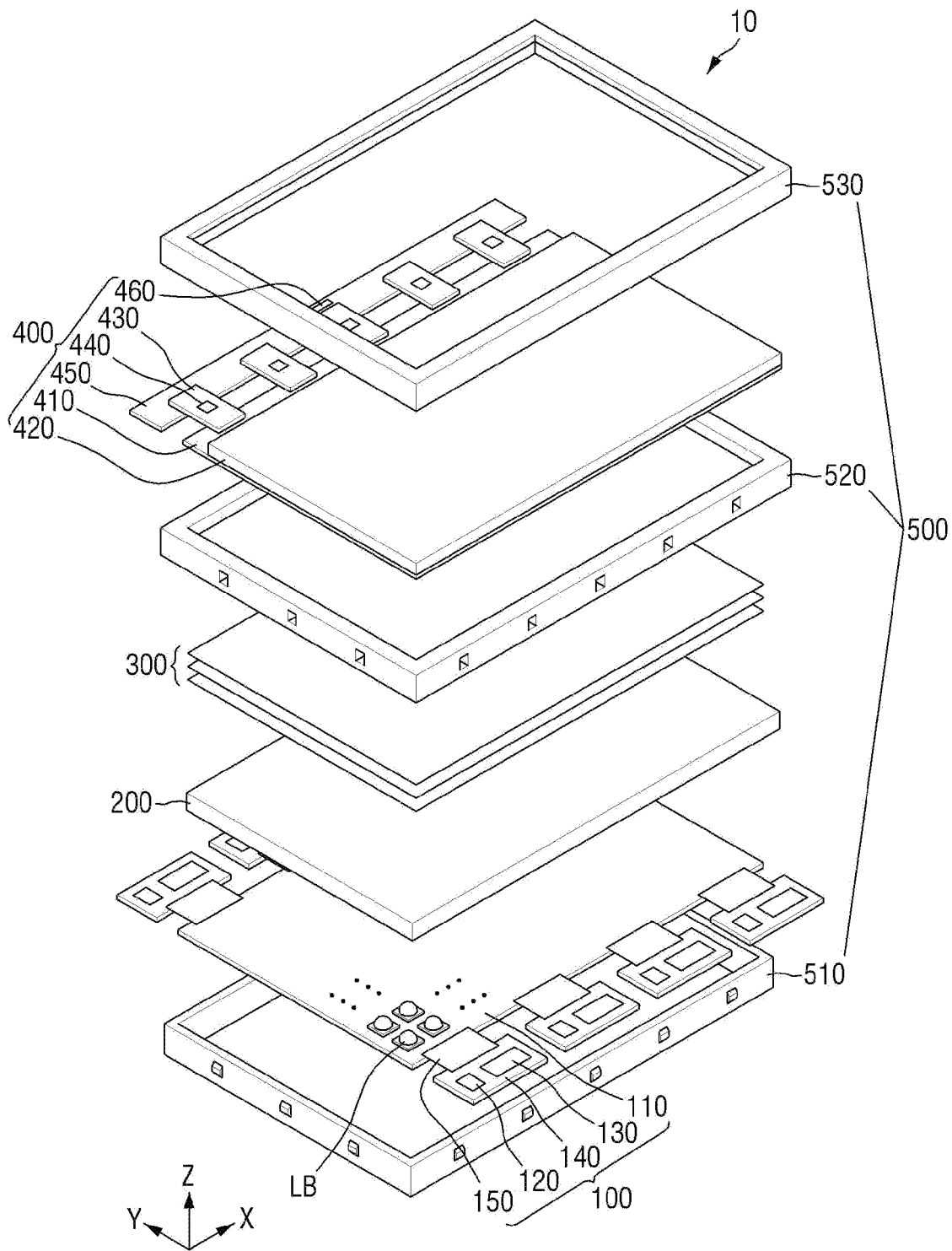
FIG. 16 is an exploded perspective view schematically illustrating a display device according to an embodiment.

FIG. 16 is an exploded perspective view schematically illustrating a display device according to an embodiment.

Figure 17:
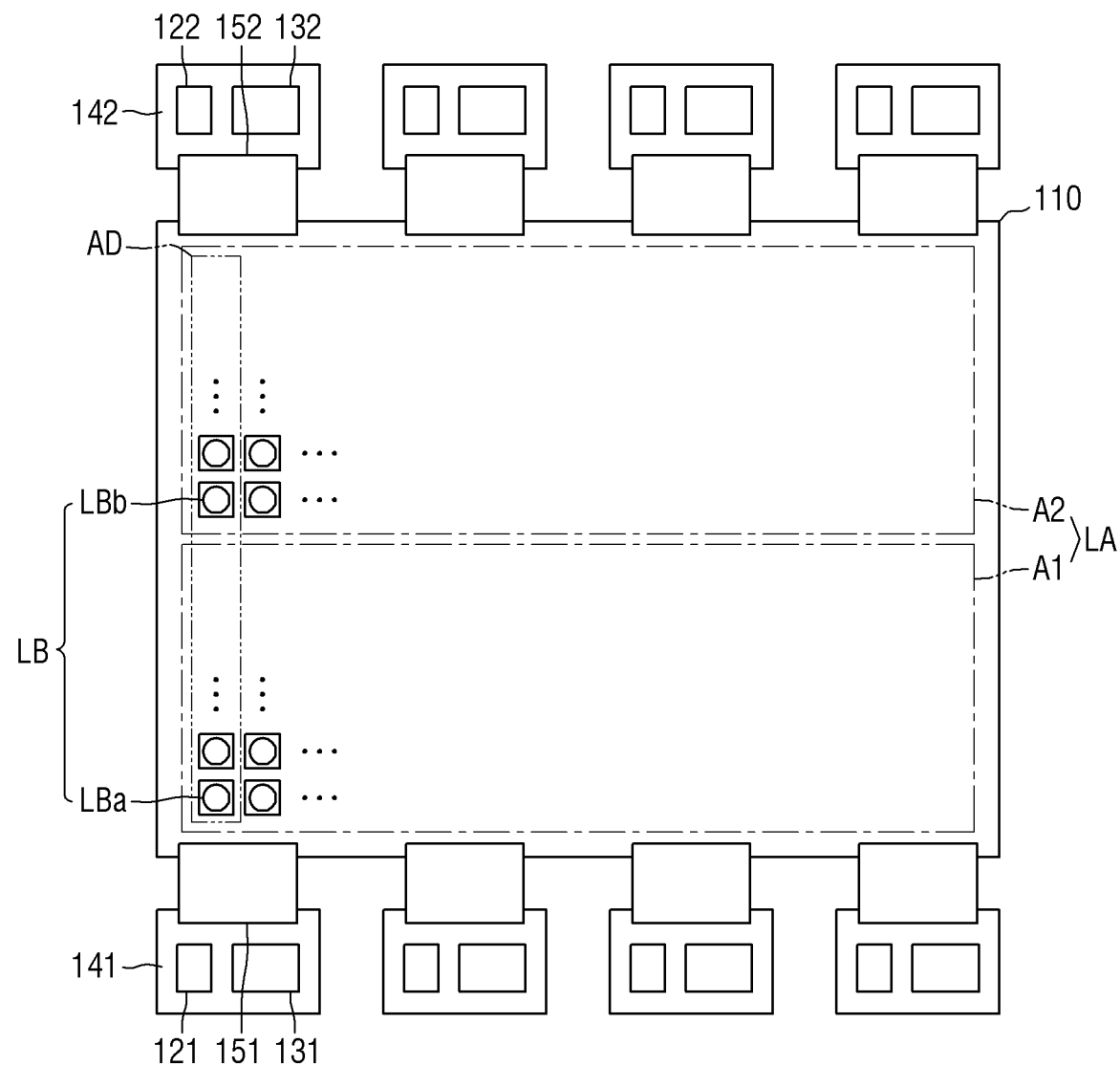
FIG. 17 is a schematic plan view of a backlight unit according to a fourth embodiment in the display device illustrated in FIG. 16.
Figure 18:
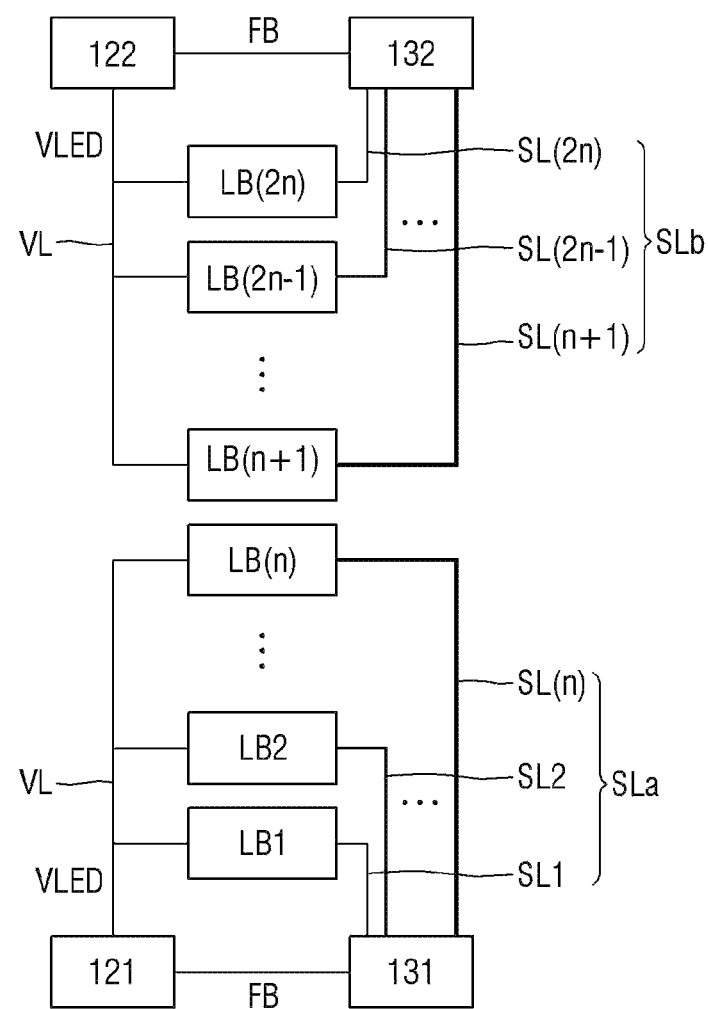
FIG. 18 is a schematic diagram illustrating an area of FIG. 16 and a connection relationship in the area.
Figure 19:
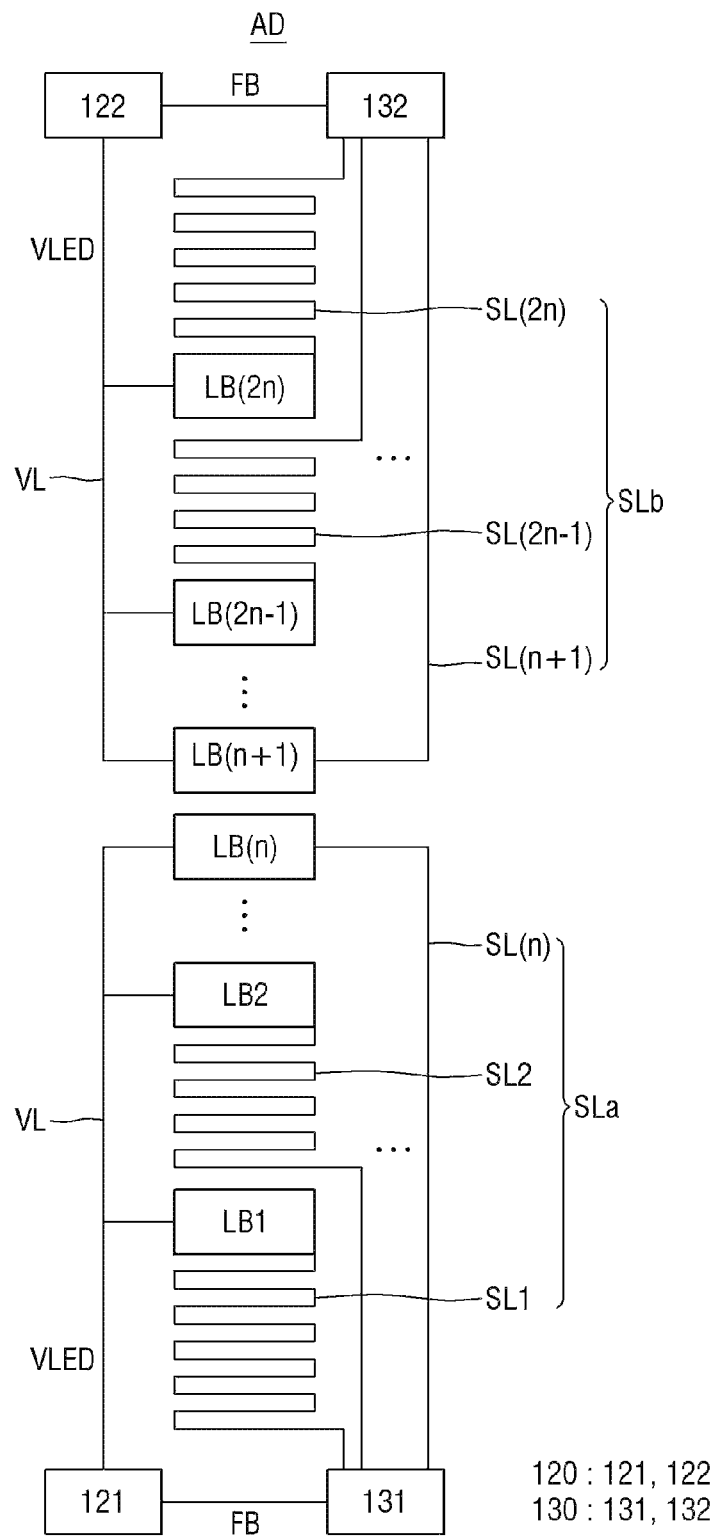
FIG. 19 is a schematic diagram of another example illustrating the area of FIG. 16 and the connection relationship in the area.

FIG. 17 is a schematic plan view of a backlight unit according to a fourth embodiment in the display device illustrated in FIG. 16. The display device illustrated in FIGS. 16 and 17 are different from the display device illustrated in FIGS. 1 and 2 in power supply parts 120, light source drivers 130, printed circuit boards 140, and flexible films 150. Therefore, detailed descriptions of the same elements are omitted. FIG. 18 is a schematic diagram illustrating an area AD of FIG. 16 and a connection relationship in the area AD. FIG. 19 is a schematic diagram of another example illustrating the area AD of FIG. 16 and the connection relationship in the area AD.

Referring to FIGS. 16 to 19, the backlight unit 100 may include a substrate 110, the power supply parts 120, the light source drivers 130, the printed circuit boards 140, and the flexible films 150.

The substrate 110 may include a light emitting area LA composed of light source blocks LB. The light emitting area LA may include a first area A1 including light source blocks LBa (e.g., LB1 to LB(n)) and a second area A2 including light source blocks LBb (e.g., LB(n+1) to LB(2n)). According to an example, the first area A1 may be adjacent to first power supply parts 121 and first light source drivers 131 mounted on first printed circuit boards 141, and the second area A2 may be adjacent to second power supply parts 122 and second light source drivers 132 mounted on second printed circuit boards 142.

The power supply parts 120 may include the first and second power supply parts 121 and 122. The first power supply parts 121 may be disposed adjacent to the first area A1 of the substrate 110, and the second power supply parts 122 may be disposed adjacent to the second area A2 of the substrate 110.

Each of the first power supply parts 121 may supply a driving voltage VLED to the light source blocks LBa (e.g., LB1 to LB(n)) of the first area A1 through power supply lines VL, and each of the second power supply parts 122 may supply a driving voltage VLED to the light source blocks LBb (e.g., LB(n+1) to LB(2n)) of the second area A2 through power supply lines VL. For example, the first and second voltage supply parts 121 and 122 may supply a same driving voltage VLED to the light source blocks LBa (e.g., LB1 to LB(n)) of the first area A1 and the light source blocks LBb (e.g., LB(n+1) to LB(2n)) of the second area A2.

For example, each of the first power supply parts 121 may receive a feedback voltage FB from the first light source driver 131 and generate the driving voltage VLED based on the feedback voltage FB. Each of the second power supply parts 122 may receive a feedback voltage FB from the second light source driver 132 and generate the driving voltage VLED based on the feedback voltage FB.

According to an example, the power supply lines VL respectively connected (e.g., electrically connected) to first to $n^{th}$ light source blocks LB1 to LB(n) may have a same resistance value. The power supply lines VL respectively connected (e.g., electrically connected) to (n+1)$^{th}$ to (2n)$^{th}$ light source blocks LB(n+1) to LB(2n) may have a same resistance value. Therefore, the backlight unit 100 according to the disclosure may minimize power consumed (or power consumption) in the power supply lines VL.

The light source drivers 130 may include the first and second light source drivers 131 and 132. The first light source drivers 131 may be disposed adjacent to the first area A1 of the substrate 110, and the second light source drivers 132 may be disposed adjacent to the second area A2 of the substrate 110.

Each of the first light source drivers 131 may control a current flowing through the light source blocks LBa (e.g., LB1 to LB(n)) of the first area A1 through first sensing lines SLa (e.g., SL1 to SL(n)). Each of the second light source drivers 132 may control a current flowing through the light source blocks LBb (e.g., LB(n+1) to LB(2n)) of the second area A2 through second sensing lines SLb (e.g., SL(n+1) to SL(2n)).

According to an example, the number of light source blocks LBa (e.g., LB1 to LB(n)) of the first area A1 may be equal to the number of light source blocks LBb (e.g., LB(n+1) to LB(2n)) of the second area A2. However, the disclosure is not limited thereto. For example, the first area A1 may include the first to $n^{th}$ (where n is a natural number of 2 or more) light source blocks LB1 to LB(n), and the second area A2 may include the $(n+1)^{th}$ to $(2n)^{th}$ light source blocks LB(n+1) to LB(2n). The first to $n^{th}$ light source blocks LB1 to LB(n) of the first area A1 may be electrically connected to each of the first light source drivers 131 through first sensing lines SL1 to SL(n), respectively, and the $(n+1)^{th}$ to $(2n)^{th}$ light source blocks LB(n+1) to LB(2n) of the second area A2 may be electrically connected to each of the second light source drivers 132 through second sensing lines SL(n+1) to SL(2n), respectively. Lengths of the first sensing lines SL1 to SL(n) may be the same as lengths of the second sensing lines SL(n+1) to SL(2n), respectively.

In FIG. 18, the first sensing line SL1 electrically connected to the first light source block LB1 may be shorter than the first sensing line SL2 electrically connected to the second light source block LB2. For example, the first sensing lines SL1 to SL(n) may be long or short according to distances between the first to $n^{th}$ light source blocks LB1 to LB(n) and a first light source driver 131, respectively. The second sensing line SL(n+1) electrically connected to the $(n+1)^{th}$ light source block LB(n+1) may be shorter than the second sensing line SL(n+2) electrically connected to the $(n+2)^{th}$ light source block LB(n+2). For example, the second sensing lines SL(n+1) to SL(2n) may be long or short according to distances between the $(n+1)^{th}$ to $(2n)^{th}$ light source blocks LB(n+1) to LB(2n) and a second light source driver 132, respectively.

The first sensing lines SL1 to SLn may have a same resistance value. According to an example, the first sensing lines SL1 to SL(n) may have different lengths according to positions of the first to $n^{th}$ light source blocks LB1 to LB(n), respectively. Since the first sensing lines SL1 to SL(n) have different cross-sectional areas according to the lengths of the first sensing lines SL1 to SL(n), respectively, they may have the same resistance value. Since the first sensing lines SL1 to SL(n) have cross-sectional areas proportional to the distances between the light source blocks LBa (e.g., LB1 to LB(n)) of the first area A1 and the first light source driver 131, respectively, they may have the same resistance value.

The second sensing lines SL(n+1) to SL(2n) may have a same resistance value. According to an example, the second sensing lines SL(n+1) to SL(2n) may have different lengths according to positions of the $(n+1)^{th}$ to $(2n)^{th}$ light source blocks LB(n+1) to LB(2n), respectively. Since the second sensing lines SL(n+1) to SL(2n) have different cross-sectional areas according to the lengths of the second sensing lines SL(n+1) to SL(2n), respectively, they may have the same resistance value. Since the second sensing lines SL(n+1) to SL(2n) have cross-sectional areas proportional to the distances between the light source blocks LBb (e.g., LB(n+1) to LB(2n)) of the second area A2 and the second light source driver 132, respectively, they may have the same resistance value.

In FIG. 19, a cross-sectional area and a length of the first sensing line SL1 electrically connected to the first light source block LB1 may be the same as a cross-sectional area and a length of the first sensing line SL2 electrically connected to the second light source block LB2. For example, since the first sensing line SL1 electrically connected to the first light source block LB1 is closer to a first light source driver 131 than the first sensing line SL2 electrically connected to the second light source block LB2, it may be bent more than the sensing line SL2 electrically connected to the second light source block LB2. For example, since the first sensing lines SL1 to SL(n) have the same cross-sectional area and the same length, they may have the same resistance value.

A cross-sectional area and a length of the second sensing line SL(2n) electrically connected to the $(2n)^{th}$ light source block LB(2n) may be the same as a cross-sectional area and a length of the second sensing line SL(2n-1) electrically connected to the $(2n-1)^{th}$ light source block LB(2n-1). For example, since the second sensing line SL(2n) electrically connected to the $(2n)^{th}$ light source block LB(2n) is closer to a second light source driver 132 than the second sensing line SL(2n-1) electrically connected to the $(2n-1)^{th}$ light source block LB(2n-1), it may be bent more than the sensing line SL(2n-1) electrically connected to the $(2n-1)^{th}$ light source block LB(2n-1). For example, since the second sensing lines SL(n+1) to SL(2n) have the same cross-sectional area and the same length, they may have the same resistance value.

Since the first sensing lines SL1 to SL(n) have the same resistance value as described above, the driving voltage VLED provided from a first power supply part 121 may drop to the same voltage value in each of the first to $n^{th}$ light source blocks LB1 to LB(n), each of the first sensing lines SL1 to SL(n), and the first light source driver 131. For example, a voltage drop in each of the first light source block LB1, the first sensing line SL1 electrically connected to the first light source block LB1, and the first light source driver 131 may be the same as a voltage drop in each of the $n^{th}$ light source block LB(n), the first sensing line SL(n) electrically connected to the $n^{th}$ light source block LB(n), and the first light source driver 131.

Since the second sensing lines SL(n+1) to SL(2n) have the same resistance value, the driving voltage VLED provided from a second power supply part 122 may drop to the same voltage value in each of the $(n+1)^{th}$t $(2n)^{th}$ light source blocks LB(n+1) to LB(2n), each of the second sensing lines SL(n+1) to SL(2n), and the second light source driver 132. For example, a voltage drop in each of the $(n+1)^{th}$ light source block LB(n+1), the second sensing line SL(n+1) electrically connected to the $(n+1)^{th}$ light source block LB(n+1), and the second light source driver 132 may be the same as a voltage drop in each of the $(2n)^{th}$ light source block LB(2n), the second sensing line SL(2n) electrically connected to the $(2n)^{th}$ light source block LB(2n), and the second light source driver 132.

Therefore, the backlight unit 100 according to the fourth embodiment requires more printed circuit boards 140 and flexible films 150 than the backlight unit according to the first embodiment but may reduce a maximum distance between the light source blocks BL and the first or second light source drivers 131 or 132 compared with the first through third embodiments. Accordingly, the resistance values of the second sensing lines SL(n+1) to SL(2n) of the backlight unit 100 according to the fourth embodiment may be smaller than the resistance values of the second sensing lines SL(n+1) to SL(2n) of the backlight units 100 according to other embodiments. Thus, the backlight unit 100 according to the fourth embodiment can further reduce power consumption compared with the first through third embodiments and can improve its efficiency by efficiently preventing heat generation of the first and second light source drivers 131 and 132.

While the disclosure has been illustrated and described with reference to the embodiments thereof, it will be apparent to those of ordinary skill in the art that various changes in form and detail may be formed thereto without departing from the spirit and scope of the disclosure.

What is claimed is:

1. A backlight unit comprising:
   a substrate comprising:
     a first area having light source blocks; and
     a second area having light source blocks; and
   a light source driver disposed on at least one side of the substrate and electrically connected to the light source blocks of each of the first and second areas through each of first and second sensing lines, wherein
   the first sensing lines electrically connected to the light source blocks of the first area have a first resistance value,
   the second sensing lines electrically connected to the light source blocks of the second area have a second resistance value, and
   a power supply part supplying a first driving voltage only to the light source blocks of the first area and supplying a second driving voltage only to the light source blocks of the second area.

2. The backlight unit of claim 1, wherein each of the first and second sensing lines has different cross-sectional areas according to a length of each of the first and second sensing lines.

3. The backlight unit of claim 1, wherein
   cross-sectional areas of each of the first sensing lines are proportional to distances between each of the light source blocks of the first area and the light source driver, and
   cross-sectional areas of each of the second sensing lines are proportional to distances between each of the light source blocks of the second area and the light source driver.

4. The backlight unit of claim 1, wherein
   the first area is closer to the light source driver than the second area, and
   the first driving voltage is smaller than the second driving voltage.

5. The backlight unit of claim 1, wherein a difference between the first and second driving voltages corresponds to a difference between a voltage applied to the first sensing lines and a voltage applied to the second sensing lines.

6. The backlight unit of claim 1, wherein the power supply part generates the first and second driving voltages based on first and second feedback voltages received from the light source driver, respectively.

7. The backlight unit of claim 1, wherein
   the power supply part supplies each of the first and second driving voltages through each of first and second power supply lines, and
   the first and second power supply lines have a same resistance value.

8. The backlight unit of claim 1, wherein
   the substrate further comprises a third area having light source blocks, and
   the light source driver is electrically connected to the light source blocks of the third area through third sensing lines having a third resistance value.

9. The backlight unit of claim 8, wherein the third sensing lines have different cross-sectional areas according to each of lengths of the third sensing lines.

10. The backlight unit of claim 8;
    wherein the power supply part providing first to third driving voltages to the light source blocks of the first to third areas based on first to third feedback voltages received from the light source driver.

11. The backlight unit of claim 1, wherein
    the light source driver comprises:
    a first light source driver disposed adjacent to the first area and electrically connected to the light source blocks of the first area; and
    a second light source driver disposed adjacent to the second area and electrically connected to the light source blocks of the second area, and
    wherein the first and second sensing lines have a same cross-sectional area and a same length.

12. The backlight unit of claim 11,
    wherein the power supply part supplying a same driving voltage to the light source blocks of the first and second areas,
    wherein the first resistance value and the second resistance value are equal to each other.

13. The backlight unit of claim 1, wherein each of the light source blocks of the first and second sensing lines comprises at least one mini-light emitting diode (LED) or micro-LED.

14. The backlight unit of claim 1, wherein
    the second driving voltage being higher than the first driving voltage, and
    the first resistance value is smaller than the second resistance value.

15. The backlight unit of claim 1, wherein
    the second sensing lines being electrically insulated from the first sensing lines.

16. A backlight unit comprising:
    a substrate comprising:
      a first area having light source blocks; and
      a second area having light source blocks; and
    a light source driver disposed on at least one side of the substrate and electrically connected to the light source blocks of each of the first and second areas through each of first and second sensing lines, wherein
    the first sensing lines electrically connected to the light source blocks of the first area have a first resistance value,
    the second sensing lines electrically connected to the light source blocks of the second area have a second resistance value
    the first area is closer to the light source driver than the second area, and
    the first resistance value is smaller than the second resistance value.

17. A backlight unit comprising:
a substrate comprising light source blocks;
a power supply part supplying a driving voltage to the light source blocks; and
a light source driver disposed on a side of the substrate and electrically connected to the substrate through sensing lines electrically connected to the light source blocks, wherein
the power supply part supplies a same driving voltage to the light source blocks, and
the sensing lines electrically connected to each of the light source blocks have a same resistance value.

18. The backlight unit of claim 17, wherein the sensing lines have different cross-sectional areas according to lengths of each of the sensing lines.

19. The backlight unit of claim 17, wherein the sensing lines have a same cross-sectional area and a same length.

20. The backlight unit of claim 17, further comprising:
a feedback line to transmit a feedback voltage from the light source driver to the power supply part, wherein
the driving voltage output by the power supply part is based on the feedback voltage.

21. A display device comprising:
a display panel displaying an image; and
a backlight unit irradiating light to the display panel, wherein
the backlight unit comprises:
a substrate comprising:
a first area having light source blocks; and
a second area having light source blocks;
a light source driver disposed on at least one side of the substrate and electrically connected to the light source blocks of each of the first and second areas through each of first and second sensing lines; and
a power supply part supplying a first driving voltage only to the light source blocks of the first area and supplying a second driving voltage only to the light source blocks of the second area, wherein
the first sensing lines electrically connected to the light source blocks of the first area have a first resistance value,
the second sensing lines electrically connected to the light source blocks of the second area have a second resistance value.

* * * * *